US007731782B2

(12) United States Patent
Kelley et al.

(10) Patent No.: US 7,731,782 B2
(45) Date of Patent: Jun. 8, 2010

(54) TEMPERATURE SWING ADSORPTION OF CO2 FROM FLUE GAS UTILIZING HEAT FROM COMPRESSION

(75) Inventors: Bruce T. Kelley, Kingwood, TX (US); Harry W. Deckman, Clinton, NJ (US); Frank Hershkowitz, Liberty Corner, NJ (US); Paul S. Northrop, Spring, TX (US); Peter I. Ravikovitch, Princeton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 235 days.

(21) Appl. No.: 12/152,877

(22) Filed: May 16, 2008

(65) Prior Publication Data

US 2008/0314244 A1    Dec. 25, 2008

Related U.S. Application Data

(60) Provisional application No. 60/930,827, filed on May 18, 2007.

(51) Int. Cl.
*B01D 53/04* (2006.01)
*B01D 53/28* (2006.01)

(52) U.S. Cl. .......................... 95/139; 95/148
(58) Field of Classification Search .......... 95/114, 95/115, 117, 123, 126, 139, 148; 96/132; 423/230
See application file for complete search history.

(56) References Cited

U.S. PATENT DOCUMENTS

| | | | |
|---|---|---|---|
| 3,594,983 A * | 7/1971 | Yearout ....................... 95/97 |
| 4,249,915 A * | 2/1981 | Sircar et al. ................. 95/99 |
| 4,578,089 A | 3/1986 | Richter et al. |
| 4,671,893 A | 6/1987 | Pinto |
| 4,698,073 A * | 10/1987 | Rohde et al. ................. 95/123 |
| 4,775,394 A | 10/1988 | Yamano et al. |
| 4,784,672 A | 11/1988 | Sircar |
| 4,892,565 A | 1/1990 | Schmidt et al. |
| 4,988,490 A | 1/1991 | Nicholas et al. |
| 5,185,139 A | 2/1993 | Krishnamurthy et al. |
| 5,733,451 A | 3/1998 | Coellner et al. |
| 5,846,295 A * | 12/1998 | Kalbassi et al. ............. 95/105 |
| 5,917,136 A | 6/1999 | Gaffney et al. |
| 6,024,781 A | 2/2000 | Bulow et al. |
| 6,221,130 B1 * | 4/2001 | Kolodziej et al. ............. 95/41 |

(Continued)

FOREIGN PATENT DOCUMENTS

DE          3308304         9/1984

(Continued)

OTHER PUBLICATIONS

D.M. Ruthven; Catherine Thaeron, "Performance of a parallel passage adsorbent contactor," Gas. Sep. Purif., vol. 10, No. 1, pp. 63-73, 1996.

(Continued)

*Primary Examiner*—Frank M Lawrence
(74) *Attorney, Agent, or Firm*—Bruce M. Bordelon

(57) ABSTRACT

Adsorption of $CO_2$ from flue gas streams using temperature swing adsorption. The resulting $CO_2$ rich stream is compressed for sequestration into a subterranean formation and at least a portion of the heat of compression is used in the desorption step of the temperature swing adsorption process.

28 Claims, 10 Drawing Sheets

U.S. PATENT DOCUMENTS

| | | | |
|---|---|---|---|
| 6,280,503 | B1 | 8/2001 | Mayorga et al. |
| 6,299,994 | B1 | 10/2001 | Towler et al. |
| 6,551,380 | B1 | 4/2003 | Reddy et al. |
| 6,610,124 | B1 | 8/2003 | Dolan et al. |
| 6,984,258 | B2 * | 1/2006 | Niclout et al. ............ 95/115 |
| 2002/0162452 | A1 | 11/2002 | Butwell et al. |
| 2005/0201929 | A1 | 9/2005 | Hershkowitz et al. |
| 2006/0165574 | A1 | 7/2006 | Sayari |
| 2006/0169142 | A1 | 8/2006 | Rode et al. |
| 2008/0148936 | A1 | 6/2008 | Baksh |

FOREIGN PATENT DOCUMENTS

| | | |
|---|---|---|
| DE | 3427804 | 4/1985 |
| DE | 100042601 | 10/1996 |
| EP | 0 015 545 B1 | 2/1988 |
| EP | 0426937 A1 | 5/1990 |
| EP | 0 595 100 A1 | 10/1993 |
| EP | 1120149 A1 | 8/2001 |
| EP | 1291067 A2 | 3/2003 |
| EP | 1674555 A1 | 6/2006 |
| EP | 1710008 A1 | 10/2006 |
| FR | 2 794 993 | 6/1999 |
| GB | 1 238 822 | 3/1970 |
| GB | 1283822 | 7/1970 |
| GB | 2 155 805 A | 10/1985 |
| JP | 62046911 | 2/1987 |
| JP | 62105906 | 5/1987 |
| JP | 62225590 | 10/1987 |
| JP | 2-135112 | 5/1990 |
| JP | 06327936 | 11/1994 |
| JP | 08131756 | 5/1996 |
| JP | 08131767 | 5/1996 |
| JP | 09187622 | 7/1997 |
| KR | 2000060821 | 10/2000 |
| KR | 2002003963 | 1/2002 |
| WO | WO 2008/050289 A2 | 5/2008 |

OTHER PUBLICATIONS

D. M. Ruthven, C. Thaeron, "Performance of a parallel passage adsorbent contactor," Separation and Purification Technology 12 (1997) 43-60.

X. Shuai, S. Cheng, A. Meisen, "Simulation of pressure swing adsorptionmodules having laminated structure," Microporous Materials 5 (1996) 347-355.

* cited by examiner

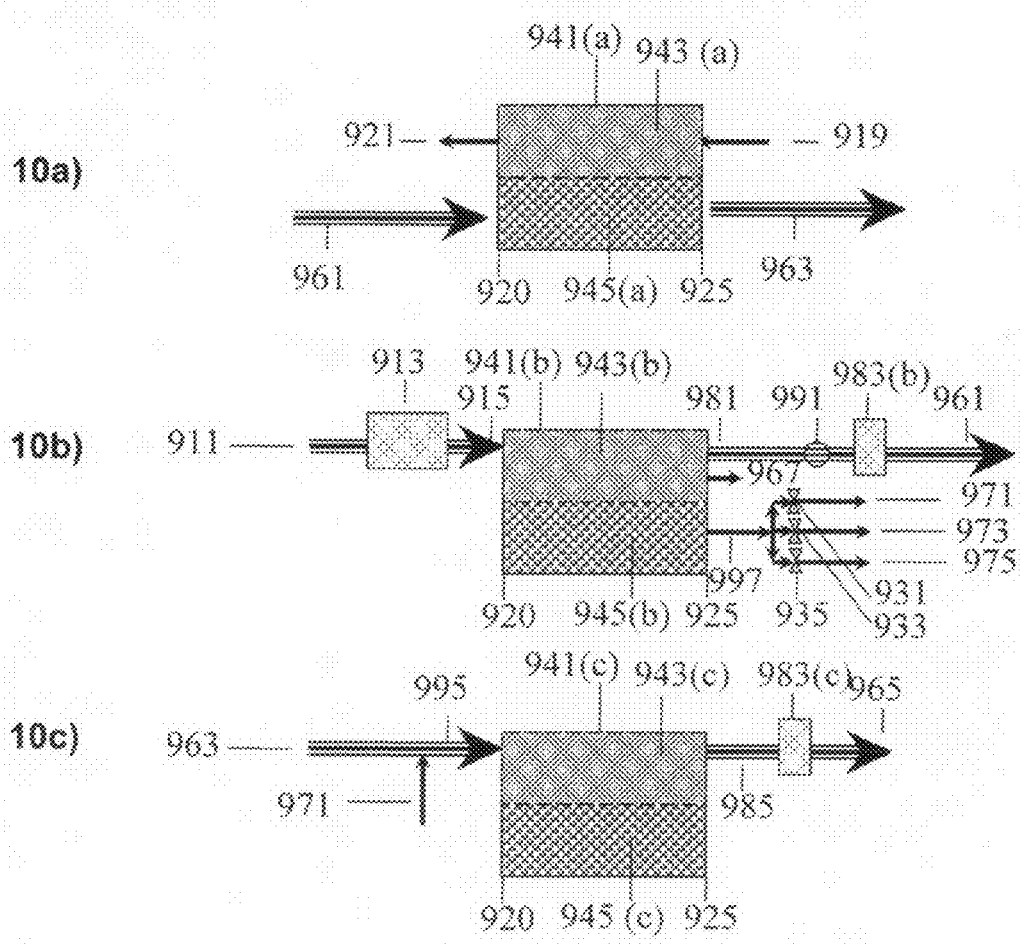

TEMPERATURE SWING ADSORPTION OF CO2 FROM FLUE GAS UTILIZING HEAT FROM COMPRESSION

CROSS REFERENCE TO RELATED APPLICATION

This Non-Provisional Application claims the benefit of U.S. Provisional Application No. 60/930,827 filed May 18, 2007.

FIELD OF THE INVENTION

The present invention relates to the adsorption of $CO_2$ from flue gas streams using temperature swing adsorption processes. The resulting $CO_2$ rich stream is compressed for sequestration into a subterranean formation and at least a portion of the heat of compression is used in the desorption step of the temperature swing adsorption process.

BACKGROUND OF THE INVENTION

Gas separation is important in various industries, particularly in the production of fuels, chemicals, petrochemicals and specialty products. A gas separation can be accomplished by a variety of methods that, assisted by heat, solids, or other means, generally exploits the differences in physical and/or chemical properties of the components to be separated. For example, gas separation can be achieved by partial liquefaction or by utilizing a solid adsorbent material that preferentially retains or adsorbs a more readily adsorbed component relative to a less readily adsorbed component of the gas mixture, or by several other gas separation techniques known in the industry. One such commercially practiced gas separation process is thermal swing adsorption ("TSA"). TSA has been an important technique for purifying gases ever since Joseph Priestley separated oxygen from air using solar heat on mercuric oxide. Temperature-swing adsorption is a process wherein a bed of adsorbent is used to selectively adsorb one or more species from a process stream, wherein the adsorbent bed is regenerated in a proceeding step by raising the temperature of the bed, thereby releasing the selectively adsorbed species.

TSA processes, when operated under certain conditions, allow a selective component or components in a gas mixture to be preferentially adsorbed within the pore structure of porous adsorbent materials relative to a second component or components in the gas mixture. The total amount adsorbed of each component in the material (i.e., the adsorption capacity), and the selectivity of the adsorption for a specific component over another component, may often be improved by operating the adsorption step of the process under specific pressure and temperature conditions since both pressure and temperature influence the adsorption loading of the components to a different extent. Species are desorbed because adsorption isotherms are strongly influenced by temperature. Thus, very high purities can be obtained by adsorbing at low temperature (where adsorption is strong) with the release of a strongly held specie being possible by means of high temperatures for desorption. Also, compared to pressure swing adsorption, TSA can be operated in the saturation regime of the isotherm, a significant advantage for capacity and range of utility with zeolitic adsorbents. In TSA processes, heat for the desorption step may be supplied directly by the adsorbent by flowing a hot desorbent gas through the bed, or indirectly through a heating coil, electrical heat source, or heat exchanger which is in intimate contact with the adsorbent.

Various methods of supplying heat to the adsorbent for regeneration have been proposed. These include microwave energy (U.S. Pat. No. 4,312,641), installation of electrical heaters inside the packed adsorbent bed of the adsorber (U.S. Pat. No. 4,269,611) and direct application of electric current to the adsorber for electrodesorption (U.S. Pat. No. 4,094,652). U.S. Pat. No. 5,669,962 discloses a dryer comprised of a shell and tube type adsorber heat exchangers wherein the internal tube surface is coated with fine water adsorbent particles. The dryer can be used in a rapid thermal swing adsorption cycle process. The adsorbent is indirectly heated or cooled by flowing hot or cold feed gas to the separation process through the shell side passage of the heat exchanger. The feed gas acts first as a cold shell side gas in a first absorber heat exchanger then is heated to act as a hot shell side gas in a second absorber heat exchanger undergoing regeneration, and then passes through the tube side of the first absorber heat exchanger where it is dried. Part of the dried gas is used as a purge gas for the tube side of the second absorber heat exchanger. Interchanging the functions of the two adsorber heat exchangers periodically reverses the cycle. The interchange may take place at intervals of from thirty seconds to three minutes. Many of the TSA processes have cycle times significantly longer than this, often as long as 12 hours.

TSA, as practiced, has several disadvantages. For example, in directly heated TSA processes, a hot fluid is typically flowed through the adsorption bed to raise the adsorbent temperature. The greater the temperature rise, the more fluid is needed. The desorbed impurities thus end up dispersed in a large volume of heating fluid, and the large amount of heat that is used to raise the adsorbent temperature is often not recoverable. In some cases, the heat is not recovered because many directly heated TSA systems are operated with long adsorption times (days) and much shorter regeneration times. Finally, the occasional and gradual regeneration gives rise to concentration and flow variations in downstream equipment that can be difficult to manage in an otherwise steady state process plant. In indirectly heated TSA systems, the heat can be supplied with a heat exchanger avoiding dilution of the product with a heated purge gas. However, heat management and the cyclic nature of indirectly heated TSA processes often presents difficulties.

In addition to gas species separations, TSA cycles have been used to thermochemically compress gases. Several heat pump and refrigeration cycles employ a thermochemical compression step (e.g., see Sywulka, U.S. Pat. No. 5,419,156).

While various swing adsorption methods have been commercially practiced over the years there still remains a need in the art for improved swing adsorption methods, particularly when separating $CO_2$ from flue gas and for more efficient use of heat generated in the process.

SUMMARY OF THE INVENTION

In accordance with the present invention there is provided a process for the removing $CO_2$ from a flue gas stream containing $CO_2$, which process comprises:

a) conducting said flue gas stream to a temperature swing adsorption gas separation unit wherein the gas separation unit contains at least one adsorbent contactor having a plurality of open flow channels through which the flue gas stream flows, wherein the surface of said flow channels are comprised of an adsorbent material that is capable of adsorbing $CO_2$ from said flue gas stream, thereby resulting in a substantially $CO_2$ free flue gas stream and $CO_2$ adsorbed onto said adsorbent material;

b) venting said substantially $CO_2$ free flue gas stream into the atmosphere;

c) heating said contactor having $CO_2$ adsorbed thereon to an effective temperature that results in the desorption of at least a fraction of $CO_2$ thereby resulting in a $CO_2$-rich stream;

d) compressing said $CO_2$-rich stream to a pressure in excess of about 1000 psig thereby resulting in a compressed $CO_2$-rich stream whose temperature has been substantially raised during compressing;

e) cooling said compressed $CO_2$-rich stream by use of a suitable heat-exchange fluid at a first temperature that captures heat from said $CO_2$-rich stream thereby resulting in a $CO_2$-rich stream of substantially reduced temperature and a heat-exchange fluid having a substantially higher second temperature;

f) using at least a portion of the heat from the heat-exchange fluid of substantially higher second temperature to provide heat to the contactor during the desorption step c) above.

In a preferred embodiment of the above invention, the temperature swing adsorption cycle is conducted with a cycle time of less than about 2 minutes between successive adsorption steps.

In another preferred embodiment of the above invention, at least about 75 mol % of the $CO_2$ in the flue gas stream is removed to produce the substantially $CO_2$ free flue gas stream.

BRIEF DESCRIPTION OF THE FIGURES

FIG. 10 hereof is an illustration of a three parallel channel contactor unit that can be used as described in Example 1 herein.

DETAILED DESCRIPTION OF THE INVENTION

Figure 1:
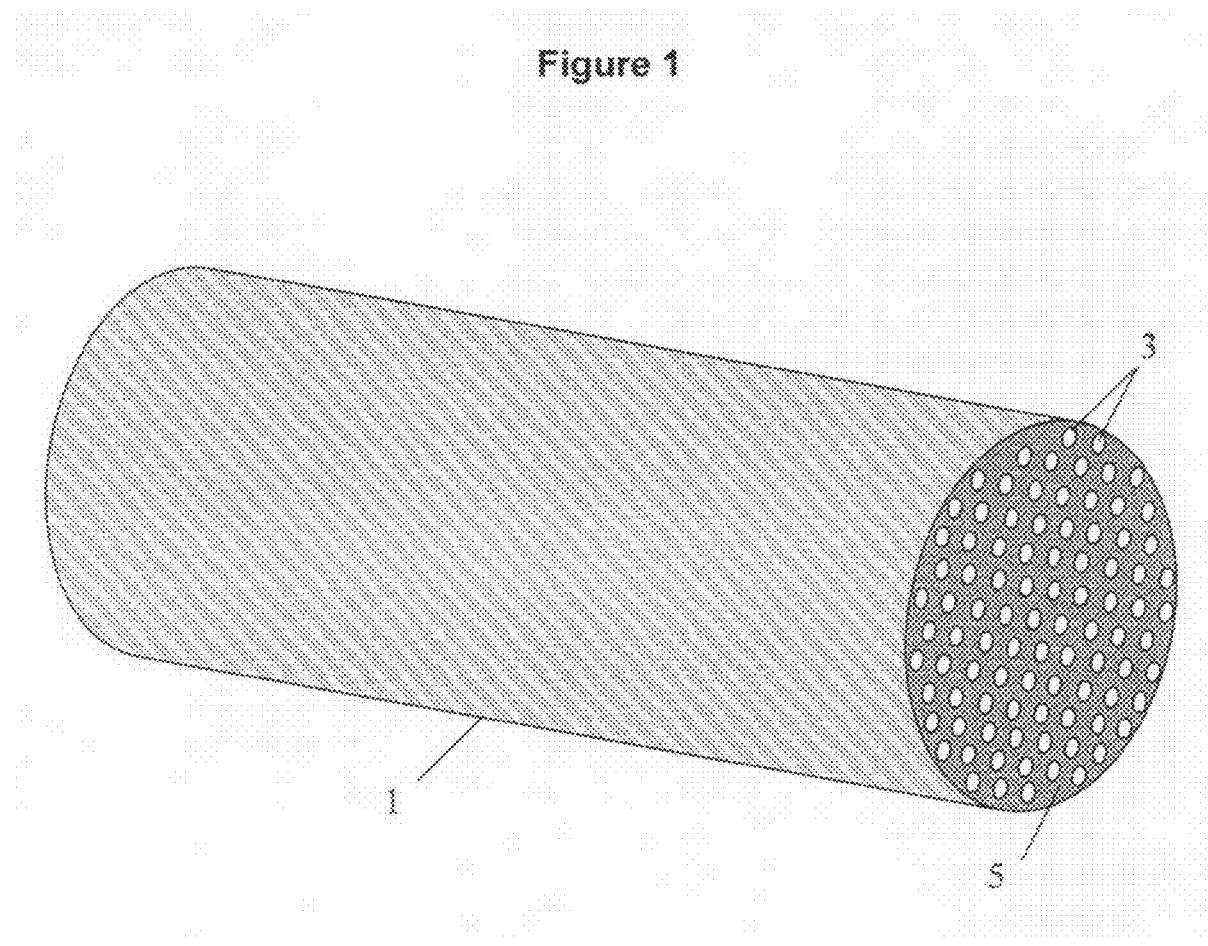
FIG. 1 hereof is a representation of one embodiment of a parallel channel contactor of the present invention in the form of a monolith directly formed from the microporous adsorbent of the present invention and containing a plurality of parallel channels.

The present invention relates to a thermal swing adsorption process that is capable of capturing $CO_2$ from flue gas. The thermal swing adsorption (TSA) process employs at least one contactor that is repeatedly cycled through at least two steps: an adsorption step and a thermally assisted regeneration step. Regeneration of the contactor is achieved by heating the contactor to an effective temperature that will result in desorbing $CO_2$ from the contactor. The contactor is then cooled so that another adsorption step can be completed. In a preferred embodiment, the thermal swing adsorption process is conducted with rapid cycles, in which case it is referred to as a rapid cycle thermal swing adsorption (RCTSA) process. A rapid cycle thermal swing adsorption process, for purposes of this invention, is defined as one in which the cycle time between successive adsorption steps is less than about 2 minutes, preferably less than about 1 minute, and even more preferably less than about 0.25 minutes. The thermal regeneration step can be assisted with a partial pressure purge displacement, or even a pressure swing. These combinations of processes are referred to herein as thermal swing processes as long as they employ a step employing an induced change in the temperature of the adsorbent at some point during the regeneration step.

Flue gas, or stack gas, is emitted in a wide variety of industrial processes. The emission pressure of most commercially generated flue gas is typically slightly above atmospheric pressure and is generally less than about two atmospheres. The temperature of the flue gas is typically in a range from about 100° C. to about 250° C., more typically about 150° C. to about 250° C., but can also be reduced to about 30° C. to about 70° C. when wet limestone scrubbing is used to remove $SO_x$. The major gaseous components are typically $N_2$, $O_2$, $CO_2$, and $H_2O$. Small quantities of pollutants such as $NO_x$ and $SO_x$ are also often present. $CO_2$ concentration in the flue gas is typically in a range of about 3 mol % to about 15 mol % and $H_2O$ is typically in the range of about 0.1 mol % to about 15 mol %. The total molar concentration of $CO_2+H_2O$ is usually less than 25 mol % when a stoichiometric combustion produces the stack gas and is usually less than 15 mol % when dilution or excess air is employed in the process to limit the temperature in the high temperature combustion process.

It is advantageous to separate the $CO_2$ contained in the flue gas into a concentrated or purified stream, compress the $CO_2$ rich stream to high pressure, and introduce it into a suitable underground formation for sequestration in order to mitigate $CO_2$ emissions to the atmosphere. Non-limiting examples of suitable underground formations include aquifers having a top seal that prevents significant loss of injected gaseous components, oil reservoirs, gas reservoirs, depleted oil reservoirs and depleted gas reservoirs. Typically, the separated $CO_2$ has to be compressed to pressures greater than about 1,000 psi, preferably greater than about 2,000 psi and often to pressures greater than about 5,000 psi to be injected into these types of underground formations. The present invention minimizes the energy required for compression by capturing $CO_2$ from flue gas at atmospheric or slightly elevated pressures (i.e., in a range from about 0 psig to about 30 psig). The present invention also minimizes energy required for compression by producing a high purity $CO_2$ stream. In a high purity $CO_2$ stream only a small fraction of the compression energy is spent on diluents such as nitrogen. By "high purity"

we mean a stream having greater than about 85 mol %, preferably greater than about 90 mol % and even more preferably greater than about 95 mol % of $CO_2$.

The present invention captures $CO_2$ from flue gas using a swing adsorption process that employs thermal regeneration and in a preferred embodiment, the process is conducted as a RCTSA process. In another preferred embodiment, the water vapor in the flue gas stream is also removed using a swing adsorption process that employs thermal regeneration. In another preferred embodiment at least about 20%, and more preferably, at least about 30%, of the heat used for the thermal regeneration step of the thermal swing adsorption process of the present invention is supplied from interstage cooling of the $CO_2$ stream that is being compressed to a pressure greater than about 1,000 psi. In another preferred embodiment, the energy required for $CO_2$ capture is reduced and the purity of the $CO_2$ stream captured is increased by regenerating with a thermal wave that passes either co-currently or counter-currently to the direction of the flue gas flow. In another preferred embodiment the thermal wave regeneration is conducted so that at least 10% of the thermal energy from one contactor is passed to another contactor in a multi-contactor thermal swing adsorption process of the present invention.

To capture $CO_2$, the flue gas stream is passed through a contactor containing a solid adsorbent material having a selectivity for $CO_2$ over $N_2$ of greater than about 5, preferably greater than about 10 for adsorbing $CO_2$ from a nitrogen-containing flue gas mixture.

Unless otherwise noted, the term "selectivity" as used herein is based on binary (pairwise) comparison of the molar concentration of components in the feed stream and the total number of moles of these components adsorbed by the particular adsorbent during the adsorption step of the process cycle under the specific system operating conditions and feedstream composition. For a feed containing component A, component B, as well as additional components, an adsorbent that has a greater "selectivity" for component A than component B will have at the end of the adsorption step of the swing adsorption process cycle a ratio:

$U_A$=(total moles of $A$ in the adsorbent)/(molar concentration of $A$ in the feed)

that is greater than the ratio:

$U_B$=(total moles of $B$ in the adsorbent)/(molar concentration of $B$ in the feed)

Where $U_A$ is the "Adsorption Uptake of component A" and $U_B$ is the "Adsorption Uptake of component B".

Therefore for an adsorbent having a selectivity for component A over component B that is greater than one:

Selectivity=$U_A/U_B$ (where $U_A > U_B$).

To efficiently use the contactor it is preferred that the loading of $CO_2$ in the adsorbent material be greater than about 0.25 millimole of $CO_2$ per gram of adsorbent material, preferably greater than about 0.75 millimole of $CO_2$ per gram of adsorbent material, and even more preferably greater than greater than about 1.5 millimole of $CO_2$ per gram of adsorbent material. Adsorbent materials that can selectively remove $CO_2$ from nitrogen containing flue gas mixtures and achieve the desired loadings include microporous materials such as zeolites, cationic zeolites, ALPO materials, and SAPO materials. Non-limiting examples of zeolites suitable for use herein include zeolite 4A, 5A, Bx, NaX and NaY. Non-limiting examples of cationic zeolites include zeolites with Si/Al molar ratios less than about 5, such as faujasite, Beta, and mordenite. Siliceous zeolites such as MFI may also be used to remove $CO_2$ from nitrogen containing mixtures. It is also within the scope of this invention that a hydrotalcite be used as the microporous material for the treatment of a flue gas stream. It is also possible for the microporous material to be made from a framework containing elements other than Si or Al, such as P. Another candidate adsorbent material is microporous carbon. Microporous sol-gel derived materials and silicas can also be candidate adsorbent materials. These materials can be used alone or in combination with other materials. It is preferred that the adsorbent in the contactor have low mesoporosity and macroporosity. The definitions of mesoporosity and macroporosity are as defined herein below. That is, the structured adsorbent contains less than about 20 vol %, preferably less than about 15 vol %, more preferably less than about 10 vol %, and most preferably less than about 5 vol % of their pore volume in open pores in the mesopore and larger size. Additionally, as described further below, in a preferred embodiment, the low mesoporous and macroporous adsorbent can contain a blocking agent to effectively reduce the overall pore volume in the mesoporous and macroporous range of the contactor adsorbent The contactor used in the practice of the present invention is designed so that more than about 75 mol %, preferably more than about 85 mol % and more preferably more than about 95 mol % of the $CO_2$ in the flue gas is captured by the adsorbent. Eventually, an adsorption front breaks through the contactor and the fraction of $CO_2$ being removed falls below these desired values whereupon the flow of flue gas is diverted into another contactor which has already been regenerated, and the contactor is thermally regenerated. After thermal regeneration, the contactor is again prepared for adsorption service, and the flow of the flue gas mixture is switched back into the contactor. The total cycle time is the length of time from when the gaseous mixture is first conducted to the contactor in a first cycle to the time when the gaseous mixture is first conducted to the same contactor in the immediately succeeding cycle, i.e., after a single regeneration of the first bed. The use of third, fourth, fifth, etc. contactors in addition to a second contactor can provide continuous processing when adsorption time is short but regeneration time is long.

As previously mentioned, flue gas often contains other species such as SOx, NOx, and/or water, at least some of which it is preferable to remove. Of these species, water is usually present at the highest concentration in the flue gas. It is preferred to incorporate adsorbent materials in the contactor to remove at least some, more preferably all, of these other species. The flue gas stream can also be passed through a separate contactor to remove one or more of these species, or remove these species in a separate unit operation. When multiple species are removed from the flue gas with individual contactors, each contactor can be optimized for the removal of a particular component. Another multiple contactor configuration is one in which a first contactor removes water and a second contactor removes one or more of SOx, NOx, and $CO_2$. Multiple contactors can be used because the present invention provides a means for individually regenerating each contactor after the adsorption step is completed.

Alternatively, several different adsorbents can be incorporated into a single contactor. Each adsorbent can be optimized for the removal of a particular molecular species. This provides a means for selectively removing several species with a single contactor. Another alternative is to process the flue gas with a single adsorbent that is capable of removing several different molecular species. Yet another alternative is to process the flue gas with a contactor that contains an adsorbent that removes $CO_2$ but does not significantly adsorb other molecular species (such as water).

When an adsorbent is incorporated within the contactor to remove water it is preferred to arrange the adsorbent so that the flue gas contacts this adsorbent before it contacts the adsorbent designed to remove $CO_2$. This can be accomplished by placing the water selective adsorbent closer to the entrance to the contactor than the $CO_2$ selective adsorbent or by layering the $CO_2$ and water selective adsorbents so that the flue gas contacts the water selective adsorbent before it contacts the $CO_2$ selective adsorbent. In some instances, the same adsorbent material is used to remove $CO_2$ and other species such as SOx, NOx, or water. Materials that can be used to adsorb SOx and NOx include zeolites, cationic zeolites, mesoporous materials, carbons, polymers and mixed matrix materials.

In this case, the most strongly adsorbed species in the flue gas (usually water) will fill the adsorbent first, thereby delaying the adsorption of the less strongly adsorbed species (usually $CO_2$) until the flue gas has flowed further down the contactor. In this case, multiple adsorption fronts move through the contactor.

In another embodiment, a glycol dehydration process can be utilized to remove water from the flue gas. The flue gas can be dehydrated in a separate process or unit operation prior to introducing it into the TSA adsorption bed. To efficiently remove water with glycol dehydration, the temperature of the flue gas has to be reduced to less than about 110° C., preferably less than about 75° C. Another dehydration process that can be used prior to contacting the flue gas with an adsorbent contactor is a physical knockout of condensed water (such as in drops or a mist).

In an embodiment, the contactor can contain a section having an adsorbent material that is capable of removing water from the flue gas. Adsorbents capable of removing water from flue gas include cationic zeolites, functionalized microporous and mesoporous materials, carbons, mixed matrix materials and polymers. When the contactor removes a significant fraction (i.e. >than about 75 mol %) of $CO_2$ and water from the flue gas entering the adsorption bed, the thermal regeneration process is designed to remove both of these species. In a preferred embodiment, the regeneration is conducted so that separate water-rich and $CO_2$-rich streams are produced during the thermal regeneration process. In another preferred embodiment, the processed flue gas exiting the adsorption bed that removes $CO_2$ has been dehydrated to below about 400 ppmv, preferably below about 50 ppmv, and more preferably below about 20 ppmv water content for at least one instant during the adsorption cycle It is preferred that the contactor be designed to provide efficient contacting of the flue gas mixture with the solid adsorbent materials that remove $CO_2$ and optionally water from the flue gas. Efficient contacting minimizes the amount of adsorbent required, volume of the contactor, and energy required to regenerate the contactor. With an efficiently designed contactor, the pressure drop of flue gas, and fluids or gasses needed to heat or cool the contactor is also minimized. This minimizes energy lost from pressure drop of flue gas flowing through the contactor and the energy required to pump or compress fluids and gases used to heat or cool the contactor.

Physical architecture of the contactors used in the practice of the present invention depends on whether the contactor is internally heated or externally heated during regeneration. With internally heated contactors, the gas or fluid used to heat the contactor directly contacts the adsorbent material. As such, the gas or fluid used to heat the contactor during regeneration passes through the same macropore volume that the flue gas did during the adsorption step. The gas, or fluid, used to heat and regenerate the adsorbent can flow co-current, counter-current or orthogonal (i.e. cross-flow) to the direction that the flue gas flows. For such internally heated contactors, $CO_2$ and any water liberated during the thermal regeneration step mixes with the gas or fluid used to regenerate the contactor. It is preferred that the $CO_2$ be separated from the gas or fluid used to regenerate the internally heated contactor before sequestering the $CO_2$. In contrast to the internally heated contactors, externally heated contactors have a separate set of channels to carry gasses or fluids used to heat and cool the contactor. Here, ideally, the separate set of channels are sealed so that gasses used to heat and cool the contactor do not mix with the flue gas or $CO_2$ liberated during the regeneration step.

Examples of internally heated contactors include a bed packed with pellets containing the $CO_2$ selective adsorbent, a beaded $CO_2$ selective adsorbent bed, a bed packed with fibers or a fibrous mat containing the $CO_2$ selective adsorbent, structured adsorbent contactors and parallel channel contactors. Structured adsorbent contactors contain a plurality of flow channels that allow gas or fluid to physically flow through the contactor. A flow channel is that portion of the contactor in which gas flows if a steady state pressure difference is applied between the points or place at which a feedstream enters the contactor and the point or place a product stream leaves the contactor. The flow channel is not considered to be part of the open meso or macropore volume of the contactor. Parallel channel contactors form a preferred subset of structured adsorbent contactors. In a parallel channel contactor there exists at least one set of channels that are substantially parallel to each other.

As previously mentioned, the structured adsorbent contactors of the present invention contain a very low volume fraction of open meso and macropores. Mesopores are defined by the IUPAC to be pores with sizes in the 20 to 500 angstrom size range and macropores are defined to be pores with sizes greater than 500 Angstroms. By open pores we mean mesopores and macropores that are not occupied by a blocking agent and that are capable of being occupied, essentially non-selectively, by components of a gas mixture.

Several different methods can be used to measure the volume fraction of open pores in a contactor. However, for purposes of this invention, the method to determine the volume fraction of open mesopores and macropores as used herein is from an analysis of the adsorption isotherm of a condensable vapor fed to the contactor. In the adsorption branch of the isotherm, capillary condensation fills empty mesopores and much of the empty macropore volume with liquid. If the condensable vapor does not enter either the micropores or free volume (in the case of polymeric adsorbents) of the adsorbent then the amount of vapor taken up in the adsorption branch of the isotherm nearly equals the empty mesopore and macropore volume. Detailed analysis of the adsorption isotherm relies in part on the Kelvin equation which is well known to those skilled in the art. The detailed analysis provides a measurement of the volume fraction of the mesopores and filled macropores in the structured adsorbent and the size distribution of open mesopores. Detailed analyses can also be used to account for any surface absorption or adsorption in either the micropores or free volume of the structured adsorbent. Methods of determining the volume fraction of open mesopores and macropores in the contactor can be found in co-pending U.S. Publication No. 2008/0282892, which is incorporated herein by reference. Detailed analyses of adsorption and desorption isotherms of condensable vapors (e.g. $N_2$ or Ar at their normal boiling points) are known to those skilled in the art.

The dimensions and geometric shapes of the parallel channel contactors of the present invention can be any dimension or geometric shape that is suitable for use in a TSA or Thermal Wave swing adsorption process. Non-limiting examples of geometric shapes include various shaped monoliths having a plurality of substantially parallel channels extending from one end of the monolith to the other; a plurality of tubular members; stacked layers of adsorbent sheets with and without spacers between each sheet; multi-layered spiral rolls, bundles of hollow fibers, as well as bundles of substantially parallel solid fibers. The adsorbent can be coated onto these geometric shapes or the shapes can, in many instances, be formed directly from the adsorbent material. An example of a geometric shape formed directly from the adsorbent would be the extrusion of a zeolite/polymer composite into a monolith. Another example of a geometric shape formed directly from the adsorbent would be extruded or spun hollow fibers made from a zeolite/polymer composite. An example of a geometric shape that is coated with the adsorbent would be a thin flat steel sheet that is coated with a microporous, low mesopore, adsorbent film, such as a zeolite film. The directly formed or coated adsorbent layer can be itself structured into multiple layers or the same or different adsorbent materials. Multi-layered adsorbent sheet structures are taught in United States Patent Application Publication No. 2006/0169142, which is incorporated herein by reference.

The substantially parallel channels in internally heated parallel channel contactors are sometimes referred to as "flow channels" or "gas flow channels". Generally, flow channels provide for relatively low fluid resistance coupled with relatively high surface area. Flow channel length should be sufficient to provide a mass transfer zone, which is, at least, a function of the fluid velocity, and the surface area to channel volume ratio. The channels are preferably configured to minimize pressure drop in the channels. In many embodiments, a fluid flow fraction entering a channel at the inlet of the contactor does not communicate with any other fluid fraction entering another channel at its inlet until the fractions recombine after exiting at the outlet. It is important that there be channel uniformity to ensure that substantially all of the channels are being fully utilized, and that the mass transfer zone is substantially equally contained. If there is excessive channel inconsistency, then productivity and gas purity will suffer. If one flow channel is larger than an adjacent flow channel, then premature product break-through, can lead to a reduction in the purity of the desired product gas or a less than optimum cycle time. Moreover, devices operating at cycle frequencies greater than about 0.1 per minute (cpm) require greater flow channel uniformity and less pressure drop than those operating at lower cycles per minute. Further, if too much pressure drop occurs across the bed, then higher cycle frequencies are not readily achieved.

The dimensions of the flow channels can be computed from considerations of pressure drop along the flow channel. It is preferred that the flow channels have a channel gap from about 5 to about 1,000 microns, preferably from about 50 to about 250 microns. Typically, flow channel lengths range from about 0.5 centimeter to 30 meter, more typically from about 10 cm to about 10 meter and a have channel gap height (or width) of about 50 to about 250 microns. The channels may contain a spacer, or mesh, that acts as a spacer. In some applications, the channels can be formed when adsorbent sheets are laminated together. For laminated adsorbents, spacers can be used which are structures or material, that define a separation between adsorbent laminates. Non-limiting examples of the type of spacers that can be used in the present invention are those comprised of dimensionally accurate: plastic, metal, glass, or carbon mesh; plastic film or metal foil; plastic, metal, glass, ceramic, or carbon fibers and threads; ceramic pillars; plastic, glass, ceramic, or metal spheres, or disks; or combinations thereof.

In a structured adsorbent contactor, most of the $CO_2$ selective adsorbent material, and optionally, the water selective adsorbent material, is incorporated as part of the wall of the flow channel. The structured adsorbent contactor may optionally contain a thermal mass to control heating during the adsorption step of the swing adsorption process. Heating during the adsorption step is caused by the heat of adsorption of molecules entering the adsorbent. The thermal mass assists in limiting temperature rise during the adsorption step and can be incorporated into the flow channel of the contactor or incorporated into the wall along with the $CO_2$ selective or optional water selective adsorbent. When it is incorporated into the wall it can be a solid material distributed throughout the adsorbent layer or be included as a separate layer.

The contactors of the present invention can better be understood with reference to the Figures hereof. FIG. 1 hereof is a representation of a parallel channel contactor of the present invention that is internally heated during the regeneration step. The parallel channel contactor is in the form of a monolith formed directly from a microporous adsorbent plus binder and containing a plurality of parallel flow channels. A wide variety of monolith shapes can be formed directly by extrusion processes and an example of a cylindrical monolith 1 is shown schematically in FIG. 1 hereof. The cylindrical monolith 1 contains a plurality of parallel flow channels 3. These flow channels 3 can have channel gaps from about 5 to about 1,000 microns, preferably from about 50 to about 250 microns. As utilized herein, the "channel gap" of a flow channel is defined as the length of a line across the minimum dimension of the flow channel as viewed orthogonal to the flow path. For instance, if the flow channel is circular in cross-section, then the channel gap is the internal diameter of the circle. However, if the channel gap is rectangular in cross-section, the flow gap is the distance of a line perpendicular to and connecting the two longest sides of the rectangular (i.e., the length of the smallest side of the rectangle). It should also be noted that the flow channels can be of any cross-sectional configuration. Preferred embodiments are wherein the flow channel cross-sectional configuration is either circular, rectangular or square. However, any geometric cross-sectional configuration may be used, such as but not limited to, ellipses, ovals, triangles, or various polygonal shapes. In other preferred embodiments, the ratio of the adsorbent volume to flow channel volume in the adsorbent contactor is from about 0.5:1 to about 100:1, and more preferably from about 1:1 to about 50:1.

The channels can be formed having a variety of shapes including, but not limited to, round, square, triangular, and hexagonal. The space between the channels is occupied by the adsorbent 5. As shown, the channels 3 occupy about 25% of the volume of the monolith and the adsorbent 5 occupies about 75% of the volume of the monolith, although the adsorbent 5 can occupy from about 50% to about 98% of the volume of the monolith. The effective thickness of the adsorbent can be defined from the volume fractions occupied by the adsorbent 5 and channel structure as:

$$\text{Effective Thickness Of Adsorbent} = \frac{1}{2}\text{Channel Diameter}\frac{\text{Volume Fraction Of Adsorbent}}{\text{Volume Fraction Of Channels}}$$

When the channel gap is in a range from about 50 to about 250 microns it is preferred that the thickness of the adsorbent layer, in the case wherein the entire contactor is not comprised of the adsorbent, be in a range form about 25 to about 2,500 microns. For a 50 micron channel gap, the preferred range of thickness for the adsorbent layer is from about 25 to about 300 microns, more preferred range from about 50 to about 250 microns.

Figure 2:
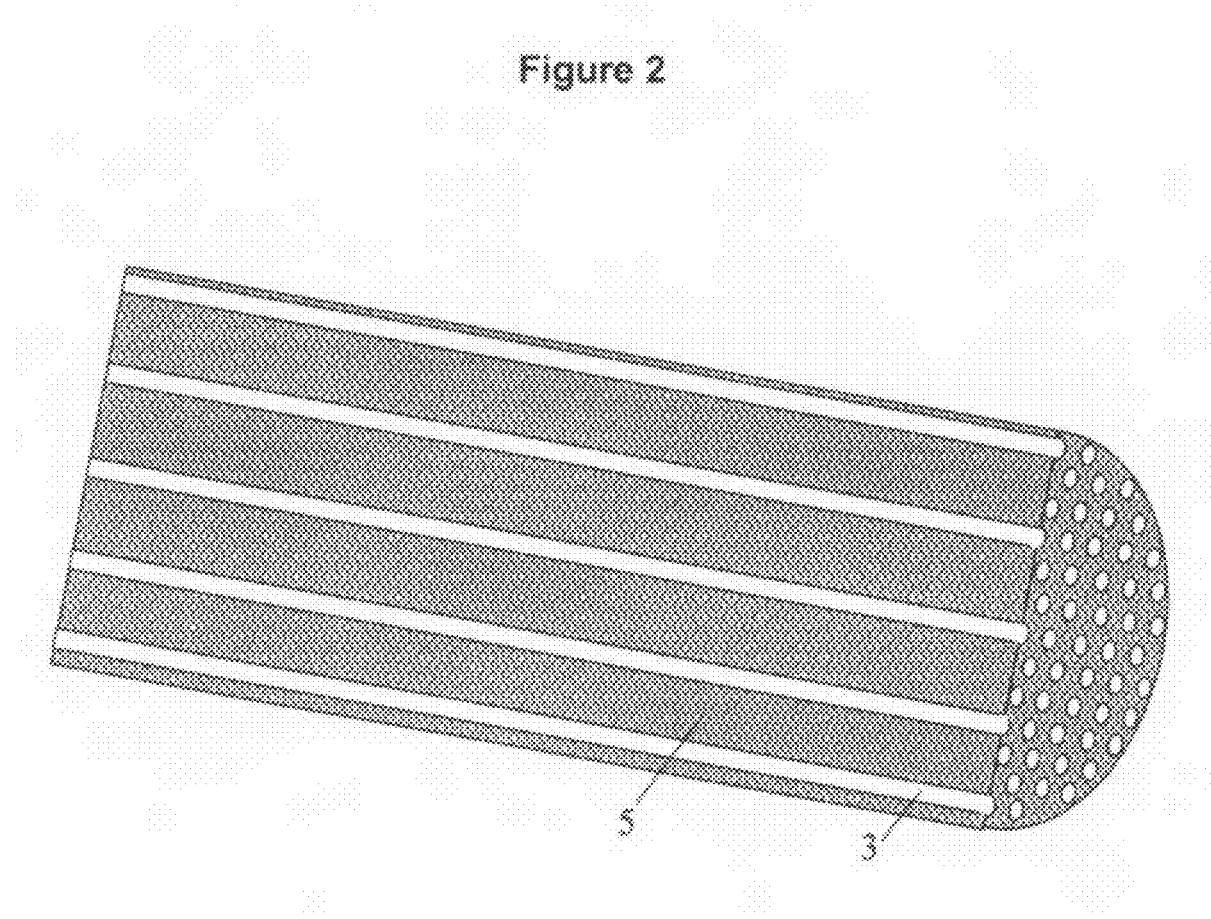
FIG. 2 hereof is a cross-sectional representation along the longitudinal axis of the monolith of FIG. 1.
Figure 3:
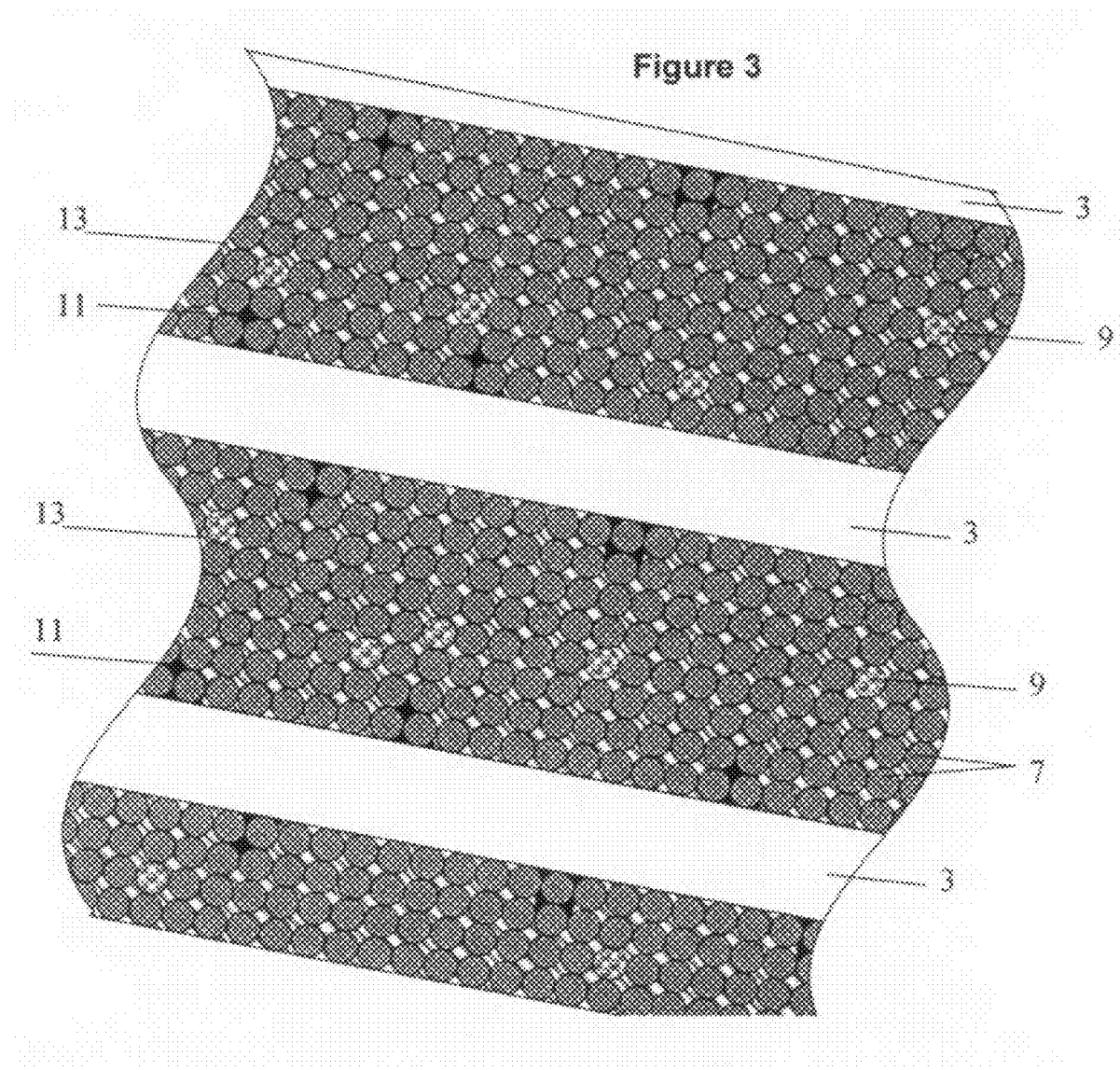
FIG. 3 hereof is a representation of a magnified section of the cross-sectional view of the monolith of FIG. 2 showing the detailed structure of the adsorbent layer along with a blocking agent occupying some of the meso and macropores.

For the monolithic parallel channel contactor of FIG. 1 that is internally heated during regeneration the effective thickness of the adsorbent will be about 1.5 times the diameter of the feed channel. FIG. 2 is a cross-sectional view along the longitudinal axis of the contactor of FIG. 1 hereof showing feed channels 3 extending through the length of the monolith with the walls of the flow channels formed entirely from adsorbent 5. A schematic diagram enlarging a small cross section of adsorbent layer 5 is shown in FIG. 3 hereof. The adsorbent layer 5 is comprised of a microporous adsorbent, or polymeric, particles 7; solid particles (thermal mass) 9, that act as heat sinks; a blocking agent 13 and open mesopores and micropores 11. As shown, the microporous adsorbent or polymeric particles 7 occupy about 60% of the volume of the adsorbent layer and the solid particles 9 occupy about 5% of the volume. With this composition, the voidage (flow channels) is about 55% of the volume occupied by the microporous adsorbent or polymeric particles. The volume of the microporous adsorbent 5 or polymeric particles 7 can range from about 25% of the volume of the adsorbent layer to about 98% of the volume of the adsorbent layer. In practice, the volume fraction of solid particles 9 used to control heat will range from about 0% to about 75% of the volume of the adsorbent layer. In a preferred embodiment the volume of the meso and macropore in the contactor is minimized. One method to minimize mesopore and macropore volume is with a blocking agent 13 that fills the desired amount of space or voids left between particles so that the volume fraction of open mesopores and micropores 11 in the adsorbent layer 5 is less than about 20%.

When the monolith is used in a flue gas separation process that relies on a kinetic separation (predominantly diffusion controlled) it is advantageous for the microporous adsorbent or polymeric particles 7 to be substantially the same size. It is preferred that the standard deviation of the volume of the individual microporous adsorbent or polymeric particles 7 be less than 100% of the average particle volume for kinetically controlled processes. In a more preferred embodiment the standard deviation of the volume of the individual microporous adsorbent or polymeric particles 7 is less than 50% of the average particle volume. The particle size distribution for zeolite adsorbents can be controlled by the method used to synthesize the particles. It is also possible to separate pre-synthesized microporous adsorbent particles by size using methods such as a gravitational settling column. It may also be advantageous to use uniformly sized microporous adsorbent or polymeric particles in equilibrium controlled separations.

There are several ways that monoliths can be formed directly from a structured microporous adsorbent. Such methods are described in co-pending U.S. Publication No. 2008/0282892, which is incorporated herein by reference.

Figure 4:
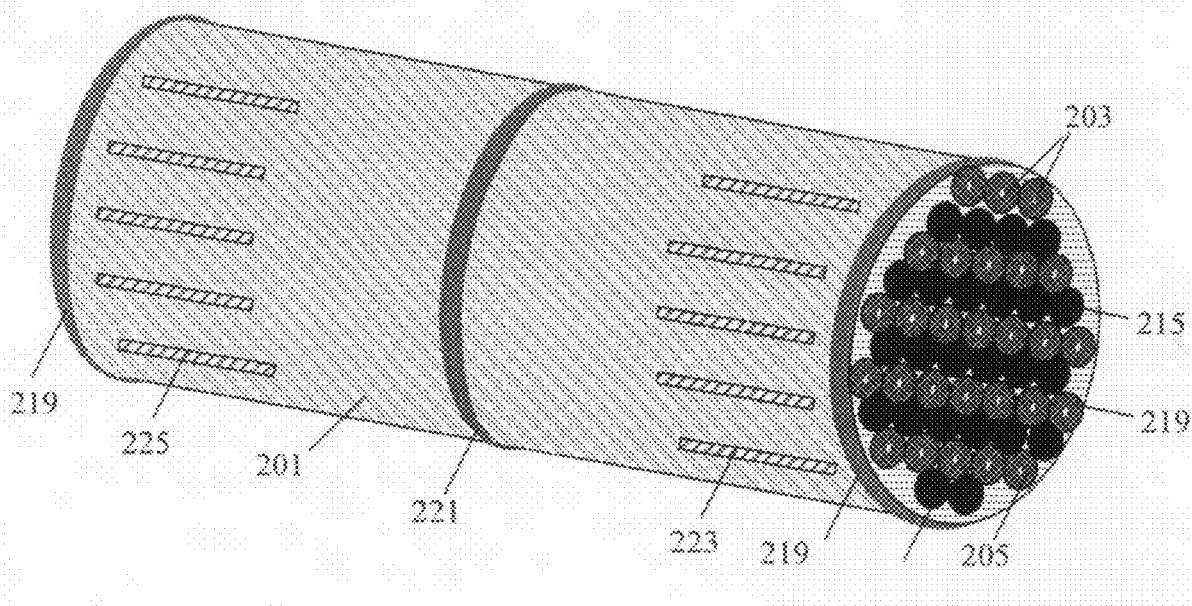
FIG. 4 hereof represents another embodiment of the present invention in which the parallel channel contactor is in the form of a coated monolith for TSA applications where the adsorbent layer is coated onto the channel walls of a preformed monolith. This figure shows separate rows of feed channels and separate rows of heating/cooling channels.

A non-limiting example of a parallel channel contactor that is externally heated during regeneration is shown in FIG. 4 hereof. FIG. 4 hereof is a representation of a parallel channel contactor of the present invention in the form of a coated monolith 201 that is externally heated during regeneration when the adsorbent layer is coated onto the channel of a preformed monolith comprised of non-adsorbent material. In this example, an extrusion process is used to form a monolith from a suitable non-adsorbent material including a metal such as steel, or a ceramic such as cordurite, zeolite, or a carbon. A ceramic or metallic glaze or sol gel coating 219 is applied to seal the channel walls of the monolith. Such glazes can be applied by slurry coating the channel walls followed by curing by firing. A sol gel can also be applied to the channel walls and then fired under conditions that density the coating. It is also possible to use vacuum and pressure impregnation techniques to apply the glaze or sol gel. In this case, the glaze or sol gel will penetrate into the pore structure of the monolith 201. In all cases the glaze seals the wall of the channel such that gas flowing thorough the channel is not readily transmitted into the body of the monolith. It may also be desirable to impregnate the pore structure of the monolith with a solid material before the channel walls are sealed. In order to provide externally heating in TSA operation, alternate rows of channels are sealed at their ends 215. At the opposite end of the monolith these same rows of channels are also sealed. Slots (223 and 225) are cut through the monolith at both ends of the monolith to provide flow access to these sealed rows of channels 215. Sealing surfaces 219 are provided at both ends of the monolith as well as in the middle of the monolith 221.

In operation, the monolith will be mounted in a module in a manner that seals the ends of the channels as well as the middle of the monolith. Any suitable technology can be used to seal the ends of the channels including metallic welds, gasketing with materials such as rubbers or carbons, and the use of adhesives such as inorganic cements and epoxies. The module is configured so that a heating or cooling fluid can be flowed through the channels sealed at the ends 215 by introducing it though the slots 223 and removing it through slots 225. The heating and cooling fluid will undergo heat exchange with fluid flowing through the channels that are open at the end of the module. These modifications to the monolith convert it into a heat exchanger and there are various other ways in which heat exchangers can be produced or configured. Non-limiting examples of such other ways include shell and tube heat exchangers, fiber film heat exchangers and printed circuit heat exchangers, all of which are well known in the art. By coating an adsorbent layer on one side of a heat exchanger it can be used in accordance with the present invention. In a preferred embodiment the adsorbent layer has a low volume fraction of meso and macropores. As such, this example illustrates how monolithic heat exchanger structures can be converted into modules suitable for externally heated TSA operation. Feed channels 203 can have diameters (channel gaps) and adsorbent layer thicknesses as previously mentioned with regard to FIG. 1 hereof.

The adsorbent layer 205 can be applied as a coating, or layer, on the walls of the flow channels by any suitable method. Non-limiting examples of such methods include fluid phase coating techniques, such as slurry coating, slip coating, hydrothermal film formation, hydrothermal coating conversion, and hydrothermal growth. When non-hydrothermal coating techniques are used, the coating solutions should include at least the microporous adsorbent or polymeric particles, a viscosifying agent such as polyvinyl alcohol, heat transfer solids, and optionally a binder. The heat transfer solid may not be needed because the body of the monolith 201 can act to as its own heat transfer solid by storing and releasing heat in the different steps of the separation process cycle. In such a case, the heat diffuses through the adsorbent layer 205 and into the body of the monolith. If a viscosifying agent, such as polyvinyl alcohol, is used it is usually burns away when the coating is cured in a kiln. It can be advantageous to employ a binder such as colloidal silica or alumina to increase the mechanical strength of the fired coating. Mesopores or macropores will typically occupy from about 20 to about 40% of the volume of the cured coating. To reduce macropore and mesopore volume, a blocking agent can be applied in a separate coating process. When hydrothermal film formation methods are chosen to apply the adsorbent layer, the coating techniques used can be very similar to the way in which zeolite membranes are prepared. An example of a method for growing a zeolite layer is taught in U.S. Pat. No. 7,049,259, which is incorporated herein by reference. Zeolite layers grown by hydrothermal synthesis on supports often have cracks and grain boundaries that are mesopore and macropore in size. The volume of these pores is often less than about 10 vol % of the film thickness and there is often a characteristic distance, or gap, between cracks. Thus, as-grown films can often be used directly as an adsorbent layer without the need for a blocking agent.

Figure 5:
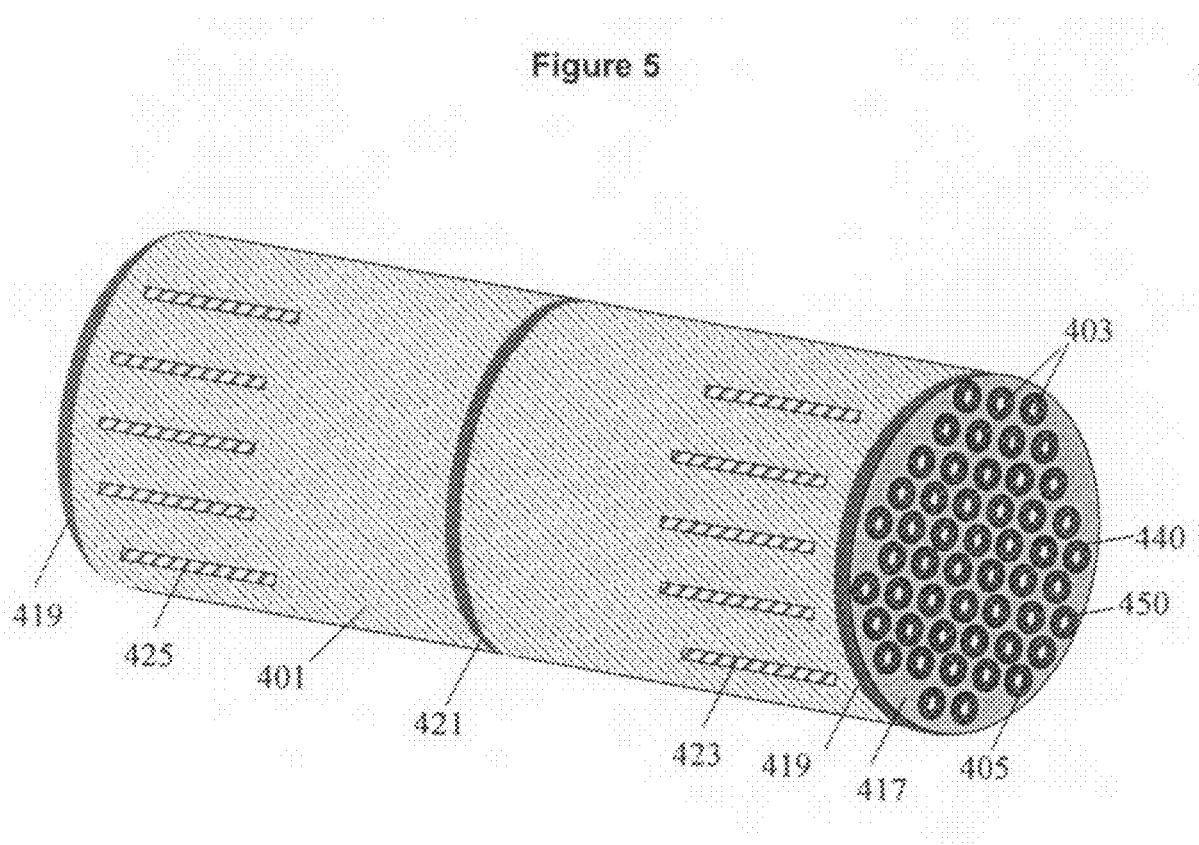
FIG. 5 hereof is yet another representation of a parallel channel contactor of the present invention but in the form of a hollow fiber contactor for TSA applications.
Figure 6:
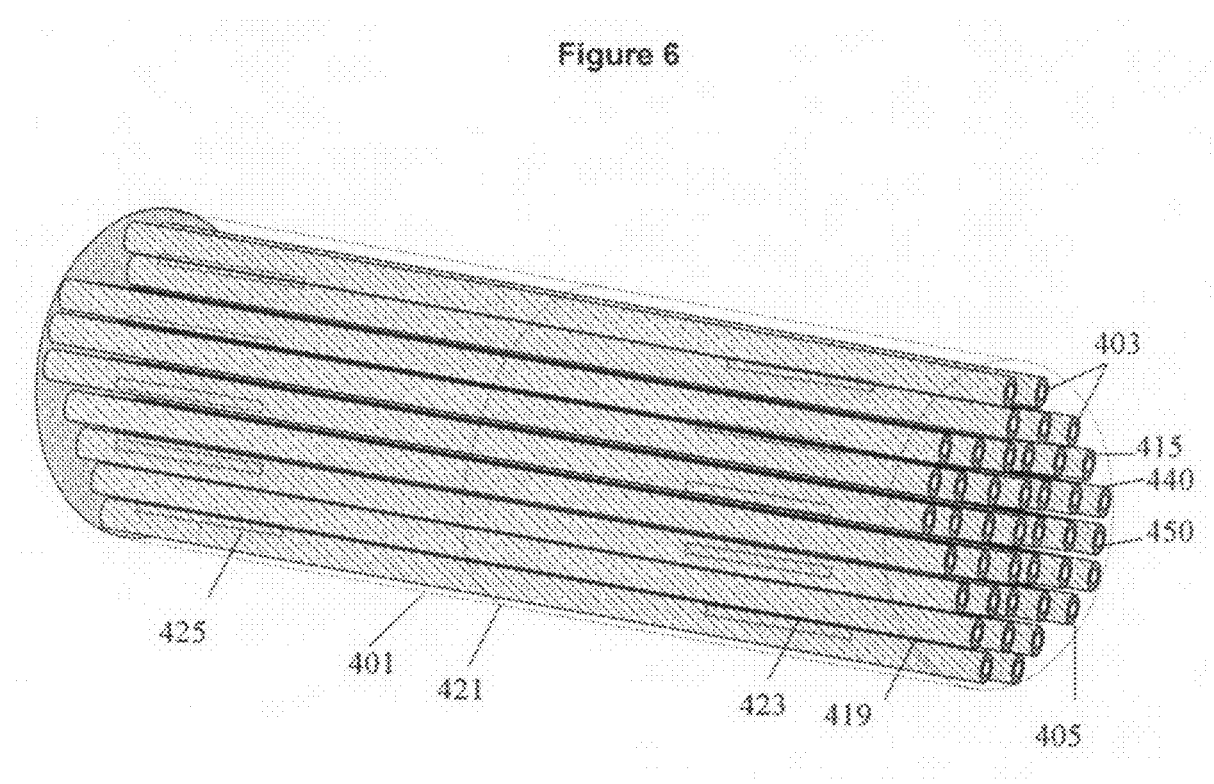
FIG. 6 hereof is another representation of a hollow fiber contactor shown in FIG. 5 but with the outer surfaces of the housing for the contactor rendered transparent. Dotted lines are used to indicate the edges of the outer surface.

FIGS. 5 and 6 hereof are representations of another parallel channel contactor structure of the present invention that is externally heated during regeneration. In this contactor for an externally heated TSA process the adsorbent layer 405 comprises part of the wall of a hollow fiber 415. In FIG. 6, the outer surfaces of the housing for the contactor 401 are rendered transparent with only dotted lines indicating the edges of the outer surface. The hollow fibers used in this example have a diffusion barrier on either the exterior surface 440 or interior surface 450. If the diffusion barrier is on the interior surface 450 then heating and cooling fluid is passed through the hollow core 403 of the fibers 415 arrayed to form the contactor. If the diffusion barrier is on the exterior surface 440, then the flue or process gas is fed through the hollow core 403.

Many different methods can be used to produce the adsorbent layer 405 in the fiber. Some of these methods are disclosed in co-pending U.S. Publication No. 2008/0282892, which is incorporated herein by reference. To make the fiber suitable for use in an externally heated TSA process a diffusion barrier is coated onto the inner surface 450 or outer surface 440 of the fiber. Non-limiting examples of materials that can act as diffusion barriers include sputter deposited metal and ceramic films, evaporated metal and ceramic films, metal and ceramic films formed by chemical vapor deposition, coated composites of polymers and solids (such as clays) and coatings of polymers that have low diffusion coefficients. To act as a diffusion barrier, the effective diffusion coefficient of the coating should be less than about 1/10 the average diffusion coefficient in the adsorbent layer and preferably less than about 1/1000 the average diffusion coefficient in the adsorbent layer. When a diffusion barrier is used, the gas in the feed channel is effectively contained in the feed channel and adsorbent layer. This can eliminate the need for a supporting matrix around the fibers, thus lowering the mass of the contactor, and in some cases allowing for the cycle time in the process to be decreased (i.e. rapid cycle operation).

Another fabrication method to make fibers suitable for used in an externally heated parallel channel contactor is to coat the adsorbent inside of prefabricated fiber such as a hollow glass fiber, hollow silica fiber or hollow polymer fiber. Coating methods previously described can be used to form an adsorbent layer inside or on the exterior surface of a prefabricated fiber. When the prefabricated fiber is made from glass, or silica, the final product has a built in diffusion barrier.

Once suitable fibers have been formed, they are gathered into a bundle and the ends of the fiber bundle are potted or embedded in a matrix material 417. This fixes the fibers into a substantially parallel array. One method to do this is with an embedding or potting process that surrounds the ends of the fibers with a matrix material 417. To visualize the potted fiber array, FIG. 6 hereof shows the parallel channel fiber contactor with the matrix material 417 rendered transparent along with the tubular housing 401.

This potted array is then sealed into a tubular housing 401. Sealing surfaces 419 are provided at the ends of the tubular housing 401. A sealing surface 421 is also provided in the middle of the housing. Slots 423 and 425 are cut through the wall near the ends of the tubular housing to allow for the flow of heating and cooling fluids and or process and product gasses. If the diffusion barrier is on the interior surface 450 flue or process gas flows through the slots 423 and 425. If the diffusion barrier is on the exterior surface 440, then heating and cooling fluid flows through the slots 423 and 425.

In operation, the tubular housing is mounted in a TSA or RCTSA (rapid cycle thermal swing adsorption) module in a manner that seals the ends of the channels as well as the middle of the monolith. As previously discussed, any suitable sealing technology can be used. In a specific example, the module is configured so that a heating or cooling fluid can be flowed inside the hollow tubular housing 401 by introducing it though slots 423 and removing it through slots 425. The heating and cooling fluid will undergo heat exchange with fluid flowing through the hollow fibers which are open at the end of the module. With these sealing arrangements, the tubular housing 401 containing the parallel array of hollow fibers becomes a heat exchanger suitable for use in TSA processes. In a preferred embodiment, the fibers have an adsorbent layer 405 with a low volume fraction of mesopores and macropores.

For externally and internally heated structured adsorbent contactors the overall adsorption rate is characterized by the mass transfer rate from the feed channel into the adsorbent. It is desirable to have the mass transfer rate of the species being removed (i.e. $CO_2$ and optionally water) high enough so that most of the volume of the adsorbent is utilized in the process. Since the adsorbent selectively removes $CO_2$ and optionally water from the gas stream, inefficient use of the adsorbent layer can lower recovery of the $CO_2$ and/or decrease the purity of the recovered $CO_2$ product stream. With use of the present invention, it is possible to formulate a structured adsorbent efficiently used in the adsorption and desorption of the heavy component. One way of doing this is to have an adsorbent of uniform thickness where the thickness of the adsorbent layer is set by the mass transfer coefficients of the $CO_2$ and optionally water and the time of the adsorption and desorption steps of the process. Thickness uniformity can be assessed from measurements of the thickness of the adsorbent, or from the way in which it is fabricated. It is preferred that the uniformity of the adsorbent be such that the standard deviation of its thickness is less than about 50% of the average thickness. More preferably, the standard deviation of the thickness of the adsorbent thickness is less than about 25% of the average thickness. It is even more preferred that the standard deviation of the adsorbent thickness be less than about 15% of the average thickness.

Calculation of these mass transfer rate constants is well known to those having ordinary skill in the art and a detailed discussion is therefore not needed herein.

A figure of merit for the mass transfer through the adsorbent layer is a time constant, $\tau_a$, for transport of the $CO_2$ and optionally water computed at each point in the adsorbent. For a planar adsorbent sheet with thickness in the x direction, and the y and z directions being in the plane of the sheet, the time constant $\tau_a$ of the heavy component is:

$$\tau_a[x,y,z] = \text{Minimum}[D_{path}/L_{path}^2] \text{ (in sec)}$$

where "$D_{path}$" is the average transport diffusion coefficient of the heavy component along a path from the feed channel to the point (x,y,z) and "$L_{path}$" is the distance along the path. There are many possible trajectories or paths from the feed channel to each point (x,y,z) in the adsorbent. The time constant is the minimum of the possible time constants ($D_{path}/L_{path}^2$) along all possible paths from the feed channel to the (x,y,z) point in the adsorbent. This includes paths through mesopores and macropores. If there is a solid material in the adsorbent (such as that which may be included for heat management) there will be no transport within it and (x,y,z) points within it are not included in the computation. The transport diffusion coefficient of each species is taken to be the single component Stefan-Maxwell diffusion coefficient for each species. The average transport diffusion coefficient along the path, $D_{path}$, is the linearly averaged diffusion coefficient along the path. A linear averaging is sufficient to provide a diffusion coefficient characterizing the path. When the heavy component has many species the diffusion coefficient, $D_{path}$, is also compositionally averaged. The diffusion coefficient depends on temperature and it may depend on pressure. To the extent that the diffusion coefficient changes, it must be averaged for the temperature and pressure changes occurring during a cycle. For an adsorbent to be efficient, the averaged thickness of the adsorbent layer preferably is chosen such that the time constant for at least half the points (or volume) in the adsorbent that is not a dense solid is less than the cycle time of the process. More preferably, the average thickness of the adsorbent layer is chosen such that the time constant for at least about 75% of the points (or volume) in the adsorbent that is not a dense solid is less than the cycle time of the process. Even more preferably the average thickness of the adsorbent layer is chosen such that the time constant for at least about 75% of the points (or volume) in the adsorbent that is not a dense solid is less than about 25% of the cycle time of the process.

For either internally heated or externally heated contactors the temperature rise must be limited during the adsorption step. The heat of adsorption for $CO_2$ in cationic zeolites is in a range from about 15 to about 40 kilo-joule per mole of $CO_2$ adsorbed. With this heat of adsorption the adiabatic temperature rise for an adsorbent loaded with 1 millimole of $CO_2$ per gram of a cationic zeolite adsorbent would be in a range from about 20° C. to about 50° C. For internally heated contactors it is preferred to limit the temperature rise during the adsorption step to less than about 20° C. by incorporating a thermal mass. To accomplish this, the ratio of thermal mass to adsorbent mass should be in a range from about 0.02 to about 2 and preferably in a range from about 0.1 to about 1. For externally heated contactors the temperature rise during the adsorption step can be limited to less than about 20° C. by pumping a cooling fluid through the heating/cooling channels or passages in the contactor. In one preferred embodiment, the cooling fluid is water. In this case, the thermal energy taken up by the water flow used to cool the contactor can be dissipated with use of a cooling tower. In another embodiment, the cooling fluid is a fluid (gas or liquid) that is flowing through a refrigeration cycle. In still another embodiment, the contactor is cooled with flue gas effluent that has $CO_2$ and water removed. This effluent is the gas that has passed through the contactor that removes the $CO_2$ and optionally the $H_2O$. In this case, the effluent is passed through the heating/cooling channels of the contactor in a direction that is counter-current to the direction of flow of flue gas being processed to remove $CO_2$. For externally heated contactors it is also possible to use a thermal mass to limit the temperature rise during the adsorption step to less than about 20° C. If a thermal mass is used with an externally heated contactor the ratio of thermal mass to adsorbent mass can be in a range from about 0.02 to about 2 and preferably in a range from about 0.1 to about 1.

With a contactor that has good mass transfer characteristics and has a means to limit the temperature rise when $CO_2$ is adsorbed, a sharp concentration front of adsorbed $CO_2$ moves along the length of the contactor during the adsorption step of the TSA cycle. Near the beginning of the adsorption step, flue gas begins to flow through the contactor and $CO_2$ is adsorbed in the adsorbent material nearest to the entrance of the contactor. This depletes $CO_2$ from the flowing gas stream that passes along the length of the contactor. The adsorbed $CO_2$ concentration falls precipitously at some point along the contactor to approximately the level left at the end of the regeneration step. The position at which the adsorbed $CO_2$ concentration falls, moves along the length of the contactor towards the exit as the adsorption step continues. This movement is referred to as an adsorbed concentration wave that moves along the length of the contactor. A sharp concentration front, or gradient, in adsorbed concentration along the length of the contactor is preferred because it enables the feed to be passed through the contactor for a relatively long time before "breakthrough" of the feedstream through the adsorbate occurs.

If mass transfer is not adequate, then the gradient will be shallow. Such a condition results in adsorbate beginning to escape the contactor long before the contactor's capacity to adsorb is well utilized. In practice, high mass transfer is achieved by providing relatively small channels for the feed fluids to travel through. This is accomplished using contactors with small flow passages or channels for gas flow.

When the adsorption front, or wave, breaks through at the exit of the contactor, the adsorption step is stopped and regeneration is initiated. To regenerate the contactor the adsorbent is heated. In a preferred embodiment, part of the heat used to regenerate the adsorbent comes from interstage cooling of the compressors used to compress the captured $CO_2$ to pressures greater than about 1,000 psi for transmission via pipeline or sequestration. It is preferred that heat drawn from interstage cooling supply energy to the contactor in a quantity greater than about 10 kilo-joule per mole, preferably greater than about 15 kilo-joule per mole, and more preferably greater than about 20 kilo-joule per mole of adsorbed $CO_2$ in the contactor. During the compression process the $CO_2$ rich gas heats up. When the temperature exceeds about 350° F., a stage of compression is terminated and the gas is cooled, preferably with use of a heat exchanger before introducing it into a subsequent stage of compression. To compress a $CO_2$-rich mixture to pressures greater than about 1,000 psi requires at least three stages of compression. The heat extracted from interstage cooling of the $CO_2$-rich gas compressors is captured with a fluid such as oil or water. The hot fluid is flowed or pumped directly through the contactor to deliver heat, or it can be passed through a heat exchanger to heat a secondary fluid that delivers heat to the contactor. In all cases, the temperature of the fluid delivering heat to the contactor is in excess of about 70° C., preferably in excess of about 100° C. and even more preferably in excess of about 120° C. In this preferred embodiment, the heat derived from interstage cooling of the $CO_2$ compressors delivers more than about 20% of the energy required to regenerate the adsorbent and preferably more than about 40% of the energy required to regenerate the adsorbent. Another source of heat that can be used to regenerate the contactor is low or medium grade waste process heat that is often discarded in industrial processes.

Heat is supplied to regenerate the contactor by passing a hot fluid (gas or liquid) counter-currently, co-currently, or cross-flow to the direction that the flue gas flows during the adsorption step. In one embodiment, individual segments of a cross-flow contactor are stacked or arranged so that the average flow of fluid during regeneration is countercurrent or co-current to the average direction of flow of flue gas during the adsorption step. One way to construct a cross-flow contactor is to coat one set of channels of a cross-flow heat exchanger with an adsorbent. Cross-flow exchangers are convenient configurations for use with the present invention because their compact configuration is achieved via high heat transfer coefficients. However, when heat and mass transfer is engineered to give temperature gradients in one set of channels and concentration gradients in the other, a single cross-flow exchanger would have some adsorption paths heat up (or cool down) earlier than others. This would lead to uneven performance, except in the cases in which the heat-up and cool-down steps are performed separately from the adsorption and regeneration steps.

Figure 7:
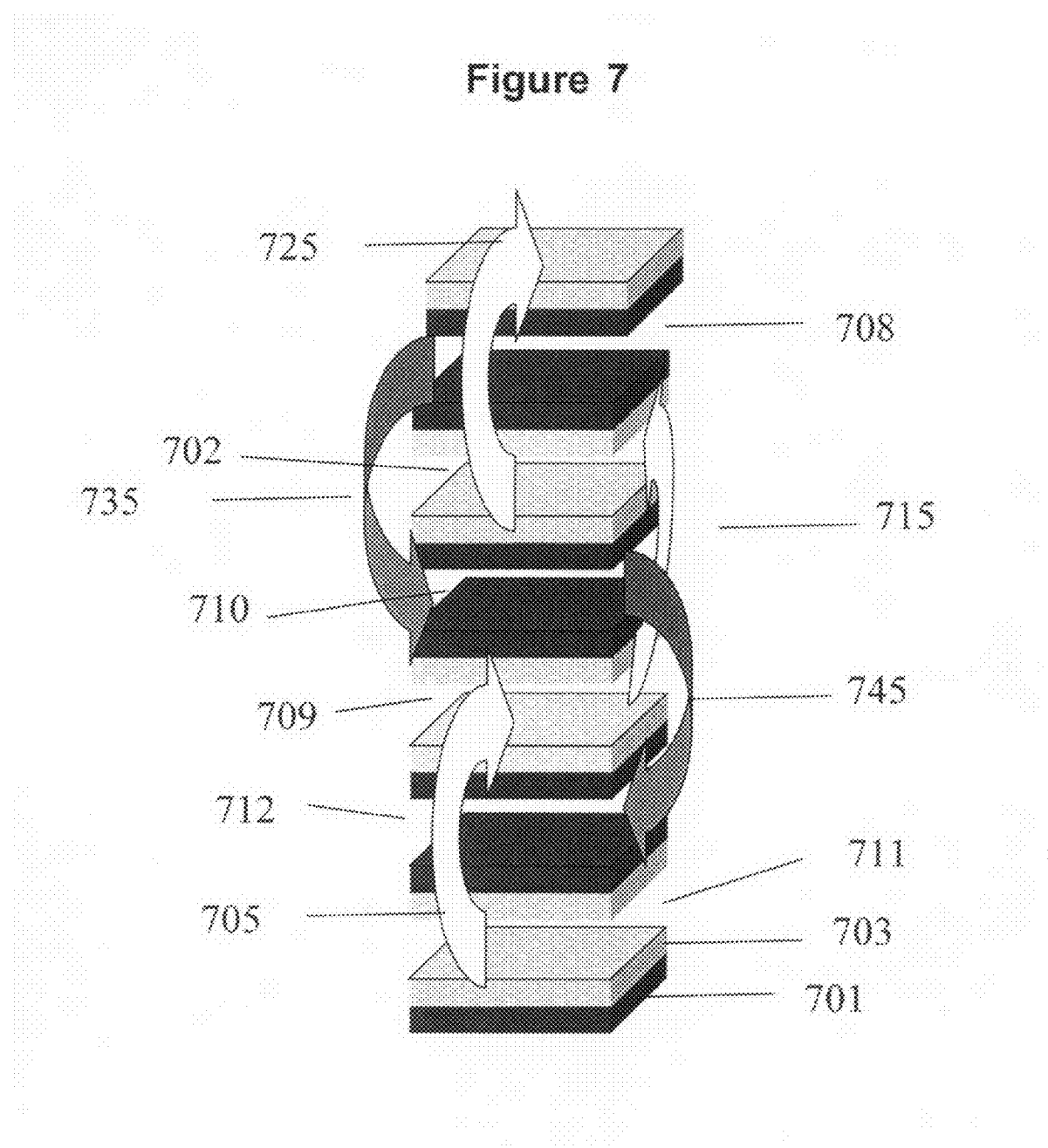
FIG. 7 hereof shows a cut away view of a cross-flow contactor that has segments stacked so that the average flow of fluid during regeneration is countercurrent to the direction of flow during the adsorption step.

FIG. 7 hereof shows a cut away view of a cross-flow contactor that has segments stacked so that the average flow of fluid during regeneration is countercurrent to the direction of flow during the adsorption step. The cross-flow contactor is constructed from a cross-flow heat exchanger which has impermeable walls separating two sets of flow channels. The wall 701 can be comprised of a material selected from the group consisting of metals, ceramics, and low gas permeability polymers. Flow channels 702, 709, and 711 are lined with a layer 703 containing an adsorbent. FIG. 7 shows the flow channel lined with similar adsorbent layers 703, but optionally one can use different adsorbent layers to line each of the adsorbent lined flow channels 702, 709, and 711. Process and produced gasses are passed through the adsorbent lined flow channels 702, 709, and 711. The layer 703 contains at least one adsorbent selective for one or more of $CO_2$, water, SOx and NOx. The layer 703 can also contain micropores, mesopores, a filler material such as a polymer, a binder material, and a heat adsorbing material.

During the adsorption step, flue gas is flowed through the adsorbent lined flow channels 702, 709, and 711 and passed sequentially (705 to 715 to 725) from adsorbent lined channels in one cross-flow segment to another (i.e. 711 to 709 to 702. During the desorption step hot fluid (gas or liquid) is passed through the heating/cooling channels 708, 710 and 712 in the contactor that are lined with the material 701 used to form the cross-flow heat exchanger. During the desorption step the fluid flowing in the heating/cooling channels 708, 710 and 712 passes counter-currently (735 to 745) to the average direction of flow during the adsorption step (705 to 715 to 725).

In the arrangement shown in FIG. 7, the cross-flow contactor segments are stacked, with both heating/cooling channels and adsorption channels connected in series. Even though each individual cross-flow module does not act in co-current flow or counter-current flow mode, the combination of several modules in series will perform in co-current flow or counter-current flow mode. This is analogous to connecting a number of continuous stirred tank reactors (CSTR's) together to simulate a plug flow reactor. One advantage of this arrangement is that the axial conductivity of the whole multi-module arrangement is very low. This facilitates the use of metal in the heat exchange portions without degrading the temperature gradients that pass through the module during regeneration. In one embodiment of the present invention, the segmented cross-flow contactors are prepared with different adsorbents so as to create an adsorbent gradation in the overall contacting unit. This arrangement can facilitate multicomponent adsorption, which may have value either because the different components are to be recovered separately, or because a first removed component would interfere with the functioning of a downstream adsorbent (e.g. removing water before a $CO_2$ adsorbent). In another embodiment of the present invention, the modules are arranged so that desorbed material can be collected individually from one or more modules as a temperature wave moves through. That is, the adsorption channel system of the modules may be connected in series for the purpose of adsorption but in parallel for the purpose of regeneration.

Because of the way the isotherm changes when the adsorbent heats up, $CO_2$ is released and the adsorbent regenerates. It is preferred to cool the contactor that has been regenerated at the end of the regeneration step and to transfer as much heat from the contactor that has finished regenerating to heat another contactor so that it can be regenerated. This is accomplished by routing fluid (gas or liquid) that has been passed through the contactor that has been regenerated into a contactor that is beginning the regeneration step. To cool the contactor that has been regenerated, fluid is introduced into the contactor that has been regenerated at a temperature at least about 25° C. lower than the average temperature of the contactor at the end of the regeneration step and preferably at least about 50° C. lower than the average temperature of the contactor at the end of the regeneration step. This fluid heats up as it passes through the contactor and this hot fluid is then flowed to heat-up another contactor. In a preferred embodiment at least 20% of the sensible heat given up in cooling the contactor to transition from the end of a regeneration step to the start of an adsorption step is transferred to another contactor and in a more preferred embodiment at least about 50% of the sensible heat is transferred to another contactor.

During the regeneration step it is preferred to heat the contactor co-currently or counter-currently to the direction the flue gas flowed during the adsorption step. Heating is accomplished by passing a hot fluid through the contactor. For a directly heated contactor the fluid passes through the same flow channels that were used in the adsorption process. This heating fluid can be either a gas or liquid. Preferred liquids include water and steam that can be separated from liberated $CO_2$ by condensation. A preferred gas is recycled $CO_2$-rich gas that is heated by flowing through a heat exchanger or another hot contactor before being introduced into the contactor being regenerated. The heat exchanger used to heat the recycled $CO_2$ can be an indirect heat exchanger such as a shell and tube heat exchanger or a direct heat exchanger such as a cyclic bed heat exchanger. For an indirectly heated contactor the fluid passes through different flow channels from those used in the adsorption step of the process. These heating/cooling flow channels in indirectly heated contactors are isolated from those used to conduct flue gas to the adsorbent. For indirectly heated contactors fluid flowed through the heating/cooling channels can be either a gas such as ammonia, a fluorocarbon, or recycled or heated $CO_2$-rich gas or a fluid such as water or oil. In all cases, it is desired that the temperature of the fluid used to heat the contactor be at least about 25° C. higher than the average temperature of the contactor during the adsorption step and preferably the temperature is at least 50° C. higher than the average temperature of the contactor during the adsorption step.

In a preferred embodiment, a thermal wave is used to pass heat through the contactor as it transitions from the adsorption to regeneration step, or in transitioning from the regeneration to adsorption step or in at least part of the regeneration step or in at least part of the adsorption step. A thermal wave is a sharp temperature gradient, that moves linearly (i.e. approximately in a single direction within the contactor) during one step of the thermal swing adsorption/desorption cycle. A more detailed discussion of thermal waves used in TSA processes can be found in co-pending U.S. Publication No. 2008/0314245, which is incorporated herein by reference. The speed at which the thermal front (i.e. region with sharp temperature gradient) moves is referred to as the velocity of the thermal wave. The velocity of the wave does not have to be constant and the direction the wave moves does not have to be the same in the adsorption and regeneration steps. For example the thermal wave in the adsorption step can move co-currently, counter-currently, or cross-flow to the thermal wave in the regeneration step. It is also possible to design a process in which there is no significant thermal wave present in the adsorption step, while there is a significant thermal wave in the regeneration step. The presence of a thermal wave in at least some portion of the thermal swing adsorption/ regeneration cycle enables the system to achieve one of the objects of this invention, which is to substantially recuperate and recover the heat required to temperature-swing the bed. This, in turn, improves process efficiency. It also enables the use of very high desorption temperatures that would not normally be considered for TSA operation.

To efficiently utilize a thermal wave for heat recovery, the fluid flowing out of one contactor has to be sent to another contactor. The fluid flow path between different contactors is determined by valves which are timed and coordinated to route fluid between contactors at appropriate points in the overall swing adsorption cycle. When fluid flows between contactors, it may also pass through a heat exchanger that adds or removes heat from the flowing fluid. It may also pass through a compressor, pump, or blower that pressurizes it so that it can flow at the desired rate though the contactors. A heat storage medium can be configured so that the energy from the thermal wave moving through one contactor is stored before it is passed to a second contactor. An example of a storage medium is a packed bed heat exchanger that is cyclically operated. In a packed bed heat exchanger energy is stored by the heat capacity of the bed. A thermal wave moves though the bed as the energy is stored as well as when it is cooled. The time for a thermal wave to pass though this heat exchanger allows one to adjust the timing of the routing of thermal energy between different contactors. Alternatively, energy can be stored in a heat exchanger with a structured heat adsorbing material such as a monolith.

Figure 8:
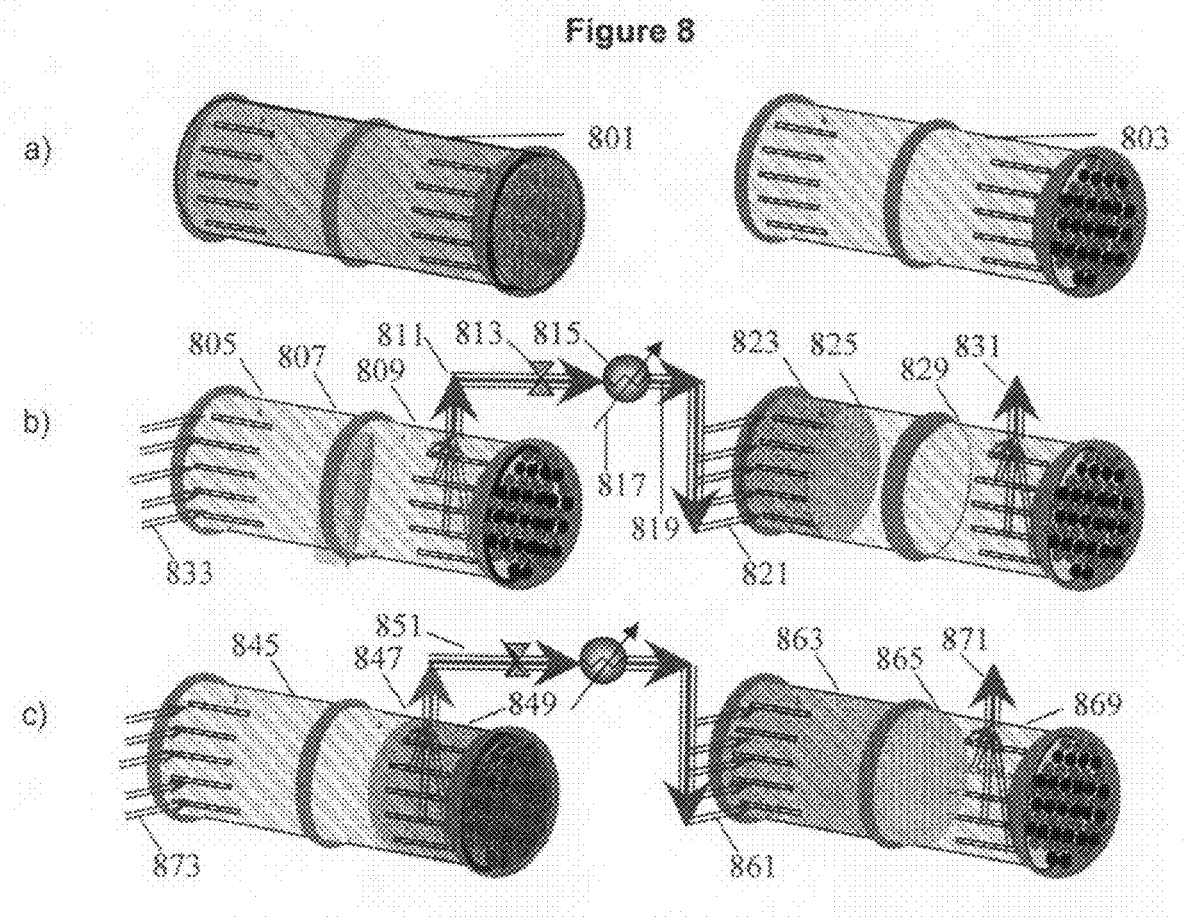
FIG. 8 hereof illustrates the use of a thermal wave to pass heat from one internally heated contactor that has been regenerated to a second contactor that has finished the adsorption step and is being heated for regeneration.

Several other thermal process integrations can be used to utilize the thermal wave behavior. In one embodiment a thermal wave is used to pass energy from a contactor that has been regenerated to a second contactor that has finished the adsorption step and is being heated for regeneration. In this embodiment a separate means of cooling is provided for contactors undergoing an adsorption step. In this embodiment the contactor that has been regenerated is being prepared for a sequential adsorption step and the contactor that has finished the adsorption step is starting to be regenerated. FIG. 8 hereof illustrates this embodiment (i.e. the use of a thermal wave to pass heat from one internally heated contactor that has been regenerated to a second contactor that has finished the adsorption step and is being heated for regeneration).

The contactors shown in FIG. 8 are externally heated monolithic contactors of the type shown in FIG. 4 hereof. The temperature of the contactors in FIG. 8 is overlaid as a semi-transparent gray coloring on the contactors. FIG. 8a shows the hot contactor 801 at the end of the regeneration step and a cooler contactor 803 that has finished an adsorption step. The darker gray color overlaying the contactor 801 indicates a higher temperature (for example in excess of 95° C.) and the lighter gray coloring on contactor 803 indicates a cooler temperature (for example less than about 40° C.). FIG. 8b shows the initial stage of cooling the contactor 801 and heating of the contactor 803. To cool contactor 801, cool fluid 833 is flowed through the heating/cooling channels of the contactor. As a heat front moves through the contactor, the temperature of the end near the entrance 805 approaches the temperature of the cooling fluid 833 while the temperature of the far end of the contactor 809 remains near the original temperature after regeneration. A sharp front 807 with a large temperature gradient separates the hot and cooler sections of the contactor. Hot fluid pushed out of the contactor is gathered to form stream 811 that is flowed to the cool second contactor 803. The stream flows through a stream selection valve and/or shutoff valve, 813, that can used to stop flow or change the routing of fluids between different contactors. Optionally, stream 811 is passed through a heat exchanger 815 to add heat to the stream 819 being sent to the heat the contactor 803. An optional stream 817 is flowed through the heat exchanger to provide heat transferred by heat exchanger 815. In one embodiment stream 817 comes from the interstage coolers of the compressor string (not shown) used to compress $CO_2$ to pressures greater than 1,000 psi. A hot stream 821 with a temperature near or above the temperature of the contactor after regeneration is passed into the cool contactor. This stream 821 drives a heat front through the contactor and the temperature near the entrance of the contactor 823 is nearly that of the hot fluid 821 while the temperature of the far end of the contactor 829 remains near the original temperature after regeneration. Another sharp front 825 with a large temperature gradient separates the hot and cooler sections of the contactor. Cold fluid is driven out of the contactor and is gathered to form stream 831. This fluid can be used to limit the temperature rise in a contactor that is adsorbing $CO_2$ out of flue gas or can be used to cool another contactor. In one embodiment the cool fluid in stream 831 is sent back to form stream 833. Optionally stream 831 is cooled via heat exchanged before it is sent back to form stream 833. As shown in FIG. 8 the changes in the hot and cold sections of contactors 801 and 803 are not in the same proportion. This is in part due to the fact that as molecules desorb some of the heat transferred to contactor 803 is taken up by the heat of desorption. If heat exchanger 815 is used to supply heat it is possible to make the thermal waves in the two contactors (801 and 803) travel at the same velocity.

FIG. 8c shows the progression of the thermal waves through the contactors (801 and 803) as the process continues. Cool fluid 873 continues flowing through the heating/ cooling channels of the contactor 801. The heat front has moved further through the contactor. Temperature in the first two thirds of the contactor 845 is nearly that of the cooling fluid 873 and the temperature of the far end of the contactor 849 remains near the original temperature after regeneration. A sharp front 847 with a large temperature gradient still separates the hotter and cooler sections of the contactor. Hot fluid pushed out of the contactor is gathered to form stream 851 that is flowed into the second contactor 803. A hot stream

861 at a temperature near or above the temperature of the contactor after regeneration is passed into the second contactor and continues to drive a heat front through the second contactor. Temperature in the first half 863 of the contactor is nearly that of the hot fluid 861 while the temperature of the far end 869 of the contactor remains near the original temperature after adsorption. Again a sharp front 865 with a large temperature gradient separates the hotter and cooler sections of the contactor. This front has only progressed about half way down the contactor while the front in the other contactor has progressed about two thirds of the way along the contactor. This difference in velocities of the two thermal fronts is due in part to the heat of desorption. Cold fluid driven out of the contactor is gathered to form stream 871 which continues to be used in other contactors.

Other thermal process integrations that can be used involve shuttling heat between one or more contactors undergoing an adsorption step and one or more contactors undergoing a regeneration step.

Figure 9:
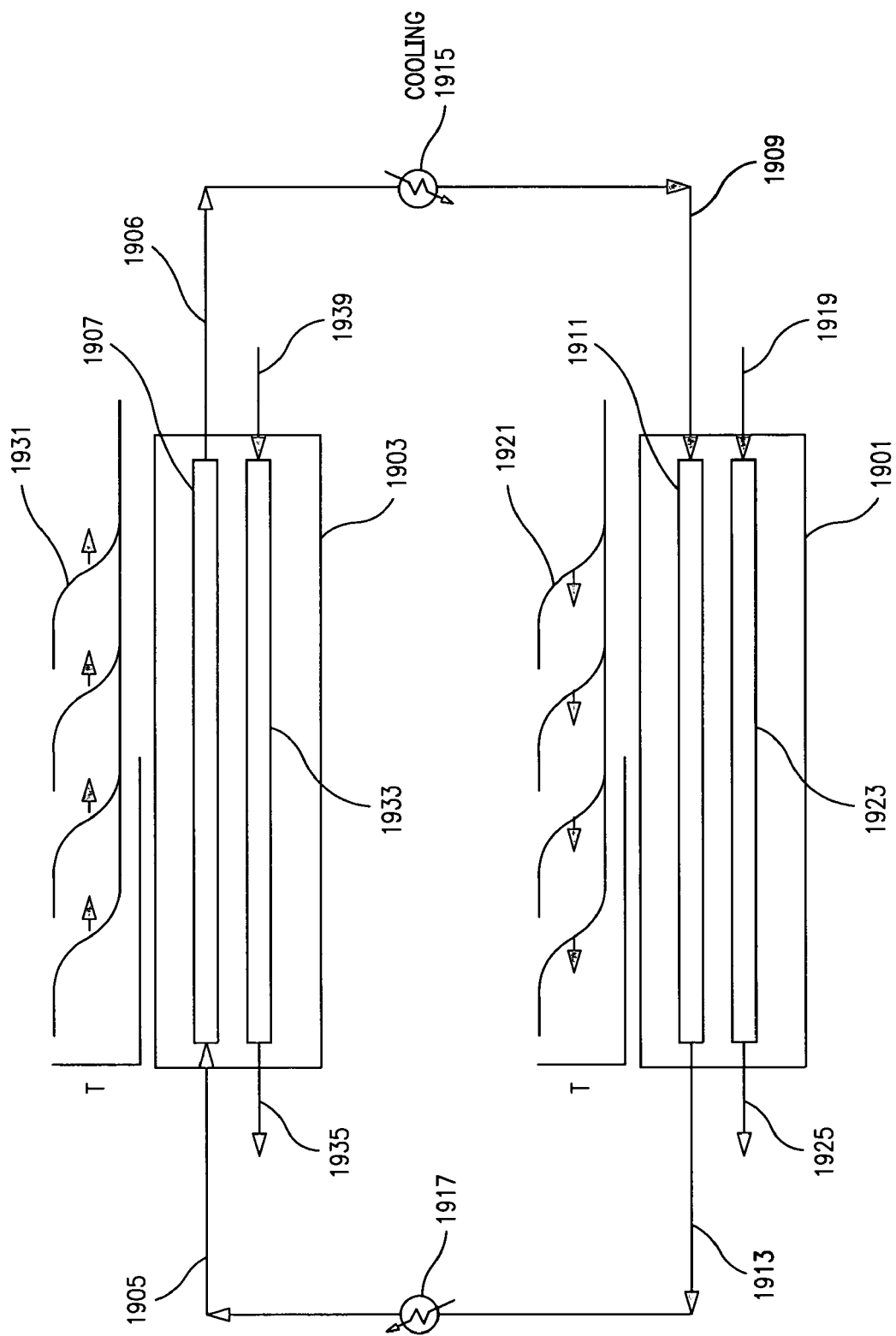
FIG. 9 is an illustration of a system of the present invention wherein one contactor undergoes an adsorption step while another contactor undergoes a desorption step and yet another contactor is being cooled.

In one embodiment, the TSA system may be operated with two contactors, one undergoing regeneration and heating while the other undergoes adsorption and cooling. This embodiment is shown schematically in FIG. 9 hereof and at any given time, an equal flow of heat transfer medium will be flowing between the contactors for heating and cooling. In the example shown in FIG. 9 hereof, contactor 1903 is being heated while another contactor, 1901, is being cooled. Because of the temperature gradient that is created by flow of heat transfer medium through the contactor, the heating (and cooling) is achieved with high levels of heat (or cool) captured within the contactor. During heating, a hot fluid 1905 is introduced into first contactor 1903, and the fluid emerges from the heating/cooling channel 1907 in a cool state 1906 until such a time that temperature breakthrough occurs and the contactor is mostly heated. Simultaneously, cooled heat transfer medium 1909 is introduced into the heating/cooling passages 1911 of the second contactor 1901. Traveling right-to-left the flowing cooling medium 1909 creates a thermal wave such that the contactor unit 1901 is cooled while the heat transfer medium is reheated. The reheated heat transfer medium 1913 is recirculated back to heat the first contactor unit 1903. In practice, due to heat losses (for example, desorbed material leaving the system hot) some heat must be added to increase the temperature of the hot heat transfer medium to its original temperature in stream 1905. In FIG. 9, additional required heat is added to stream 1913 by passing it through heat exchanger 1917.

In one embodiment of the present invention, heat is removed from the cool heat transfer medium to maintain it at a predetermined temperature notwithstanding temperature breakthrough from the contactor unit. Typically, the cooled heat transfer fluid (exiting the cool-down step) will be at a temperature that approaches the separation feed temperature. Cooling via heat exchange 1915 can also be provided to decrease the cooling fluid temperature to a temperature lower than that of the incoming flue gas stream 1919, thus pre-cooling the adsorbent to a temperature below the incoming separation feed temperature. The flue gas stream 1919 is passed into adsorbent lined channels 1923 at the cool end of contactor 1901. The flow rate of the flue gas is such that $CO_2$ and optionally water, SOx and NOx are adsorbed before reaching the thermal front. The progression of the thermal front (or wave) through contactor 1901 is plotted 1921 schematically in FIG. 9.

During adsorption, the strongest-adsorbing components will attach most strongly to the contactor adsorbent and will be the least mobile. They will occupy the regions of adsorbent closest to the inlet and will displace weakly adsorbed materials from that region. Over the period of adsorption, the adsorbates will order themselves from strongest to weakest along the contactor adsorbent from the inlet to outlet of the adsorption channels of the contactor. For most adsorbent materials, water is the most strongly adsorbed component of the flue gas mixture. In all cases a sharp concentration front moves through the contactor and the position of the front at all times remains behind the thermal front. As such $CO_2$ is always adsorbed in the cool section of contactor 1901. Stream 1925 emerges from the adsorbent lined channels 1923 with most of the $CO_2$ removed and optionally most of the water, SOx and NOx also removed. In a preferred embodiment, the composition of stream 1925 is such that more than 80 mol % and preferably more than 95 mol % of the $CO_2$ present in the flue gas 1919 entering the adsorbent channel 1923 is removed. In FIG. 9, the orientation of contactor 1903 during a previous adsorption step was such that the most weakly adsorbed species are nearest to the end where the hot fluid 1905 is introduced. The motion of the thermal front (or wave) through the contactor is plotted 1931 schematically in FIG. 9. It is seen that the thermal waves (1931 and 1921) move in opposite directions through the contactors. Depending upon the detailed nature of the sorbent and the molecules being sorbed it may be preferable to arrange the piping between contactors so that the thermal waves run co-currently through the contactors.

When the thermal waves 1931 and 1921 move counter-currently through the contactor, the region of the contactor containing the weakest-held adsorbates will be heated first, followed by next weakest, and next, until the strongest-adsorbed materials are heated at the end. The order in which these adsorbates are released into the adsorbent lined flow channel 1933 matches the order in which they are heated. If the piping was arranged so that the thermal waves move co-currently through the contactors, the region of the contactor containing the strongest-held adsorbates will be heated first, followed by next strongest, and next, until the weakest-adsorbed materials are heated at the end. Depending on properties of the adsorbent it can be advantageous to pipe the contactors so that the thermal waves move co-currently. In either case separate streams of adsorbates can be collected in different lines or vessels to achieve a continuous multicomponent adsorptive (a.k.a. chromatographic) separation.

The adsorbates can flow out of the contactor being regenerated co-currently or counter-currently to the thermal wave passing through the contactor. In this illustration, the desorbed species flow in stream 1935 out of the adsorbent lined channels 1933 of contactor 1903 counter-currently to the direction of the thermal wave. It is also possible to achieve a continuous multicomponent adsorptive (a.k.a. chromatographic) separation with a co-current desorption. In this alternative embodiment, the desorption flow is taken in the opposite direction to what is illustrated in FIG. 9, such that the weaker-adsorbing components must flow back over the stronger-adsorbing on the way out of the bed. This approach can provide a cleaner condition of the adsorption-step bed exit, resulting in higher-purity effluent during the adsorption step. It can also give more-separated adsorbates under some conditions in the adsorbate effluent. In an optional desorption modality a sweep fluid 1939 is used to assist the desorption process. When desorption is performed co-currently with the thermal wave a preferred embodiment of this optional modality introduces a sweep, or purge, with a velocity that nearly matches that of the thermal wave moving along the bed.

In the practice of the present invention, it may be desirable to operate with a multiplicity of contactor units in such a manner that several units are coupled in heating & cooling operation, while other units are involved in adsorption (and/or desorption). In this operation, the contactor can be substantially cooled by the circulating heat transfer medium before it is switched into service for adsorption. The advantage of this operation is that the heat used to swing the bed is retained in the heat transfer medium. If adsorption was to proceed simultaneously with cooling, then a substantial part of the heat in the bed will be lost to the adsorbate-free feed, and a higher heat load will be needed to restore the high temperature of the heat transfer medium.

In addition, in many cases (particularly for impurity removal) the time required for adsorbent regeneration may be shorter than the time required for the contactors adsorption capacity to be fully utilized. In such cases, it may be desirable to have several contactors in the adsorbing phase while two paired contactors are in the heating/regeneration phase and the re-cooling phase. In a preferred embodiment, the several contactors engaged in adsorption are connected in serial fashion, such that the most-recently regenerated contactor unit is the last bed in line, and the first unit in line will be next to be regenerated. In another preferred embodiment, the adsorbing units are connected in parallel, such that each adsorber treats a fraction of the whole feed. In yet another embodiment, thermal wave storage devices are used to store and allow proper timing of the cycles.

When the contactors are used in this manner, it is acceptable for each contactor unit to be oriented in a co-current flow, counter-current flow, cross-flow, or other configuration. However, in a preferred embodiment, the contactors are used in co-current flow and/or counter-current flow orientation.

The present invention can better be understood with reference to the following examples that are presented for illustrative purposes and not to be taken as limiting the invention.

EXAMPLE 1

This example illustrates use of a parallel contactor in a separation that removes $CO_2$ from flue gas in a thermal swing adsorption process. Flue gas, or stack gas, is emitted in a wide variety of industrial processes. Pressure of the flue gas is typically slightly above atmospheric pressure and is generally less than two atmospheres.

A thermal wave adsorption process as described herein above is preferably employed to remove $CO_2$ from hot stack gas. The thermal wave adsorption process uses a parallel channel contactor to remove more than 70 mol % of the $CO_2$ out of the stack gas, preferably more than 80 mol % of the $CO_2$ out of the stack gas, even more preferably more than 90 mol % of the $CO_2$ out of the stack gas and most preferably more than 95 mol % of the $CO_2$ out of the stack gas. At least one $CO_2$ rich stream is produced in the process that has a purity such that it contains more than 70 mol % $CO_2$, preferably more than 80 mol % $CO_2$ and even more preferably more than 90 mol % $CO_2$ and most preferably more than 95 mol % $CO_2$.

This example illustrates a thermal wave process with sequential adsorption, desorption and cooling steps operated with three parallel contactor units. Those skilled in the art can construct several other potential embodiments of thermal wave process to remove $CO_2$ from flue gas using this example. Many of these embodiments involve the use of other numbers of contactors to construct a process.

In the three unit operation of this example, one contactor undergoes an adsorption step while another contactor undergoes a desorption step and yet another contactor is being cooled. A diagram of the three unit process is shown in FIG. 10 hereof. FIG. 10a shows the streams flowing into and out of the contactor 941(a) during the adsorption step. FIG. 10b shows the streams flowing into and out of the contactor 941(b) during desorption/regeneration step. FIG. 10c shows the streams flowing into and out of the contactor 941(c) during the contactor cooling step. The contactors 941 (a), 941(b) and 941(c) are substantially similar. Properties of the contactors are similar to those discussed for FIG. 8 hereof with each contactor having an array of heating/cooling channels 943 and adsorbent channels 945.

In this example, the adsorbent contains a microporous material. The microporous material is chosen so that at the temperature of the adsorption step in the process it adsorbs more than about 0.25 millimole of $CO_2$ per $cm^3$ of adsorbent from an atmospheric gas mixture containing about 90 mol % $N_2$ and about 10 mol % $CO_2$. In a preferred embodiment the adsorbent contains at least a microporous material, such that at the temperature of the adsorption step in the process, it will adsorb more than about 0.75 millimole of $CO_2$ per $cm^3$ of adsorbent from an atmospheric gas mixture containing 90 mol % $N_2$ and 10 mol % $CO_2$. In a more preferred embodiment the adsorbent contains at least a microporous material such that, at the temperature of the adsorption step in the process, it will adsorb more than about 1.5 millimole of $CO_2$ per $cm^3$ of adsorbent from an atmospheric gas mixture containing 90 mol % $N_2$ and 10 mol % $CO_2$. Depending upon design, the adsorption step can be conducted in a temperature range from about 2° C. to about 60° C., preferably in a temperature range from about 5° C. to about 45° C. and more preferably in a range from about 5° C. to about 35° C.

Regeneration of the adsorbent is done with heat contained in the stack gas and FIG. 10b shows the stream flow into and out of the contactor 943(b) being regenerated 941(b). Stack gas 911 enters the "heating/cooling channel" (as opposed to the adsorbent channel) at the temperature at which it is produced which is preferably in a range from about 150° C. to about 250° C. When the regeneration process starts the temperature of contactor 941(b) is in a range from about 2° C. to about 35° C. Before the stack gas 911 enters the contactor 941(b), the stream 911 can optionally be fed through a process block 913 that removes particulates. Several different methods to remove particulates can be used including filtration with ceramic candle filters, monolithic inorganic (metal or ceramic) filters, tubular metal filters, polymeric, or bag filters. Alternatively an electrostatic precipitator can be used to remove particulates. A stream 915 that is nearly at the same temperature of the flue gas stream 911 emerges from the optional process block 913 and enters the heating/cooling channels 943(b) of parallel channel contactor 941(b). At the start of the desorption step the microporous adsorbent material in the contactor contains adsorbed $CO_2$. A specific example of loading in the most preferred range would be a volume average $CO_2$ loading of 1.7 millimole per $cm^3$ of the microporous adsorbent material. As the stream 915 begins to flow into the contactor 941(b), gas begins to flow out of the adsorption/cooling channels 943(b) forming stream 981. When the process starts stream 981 is at the initial temperature of the contactor. The temperature of stream 981 increases slightly as a thermal wave moves through the contactor. The temperature of stream 981 increases sharply when the thermal wave moves to the end of the contactor. It is preferable not to terminate desorption before the thermal wave has moved through the contactor. If the thermal wave breaks through the contactor before the adsorption step (FIG. 10a) has been completed, then an additional thermal bed 983(b) can be employed to soak up heat until it is time to stop the adsorption, desorption/regeneration and contactor cooling steps. The thermal bed 983(b) can be a packed bed of solid particles through which a thermal wave also passes. If the thermal mass is a packed bed of solid particles its temperature at the start of the regeneration process is near that of the adsorbent bed.

It is preferred that the regeneration and cooling steps be terminated for the thermal front to break through the contactor before adsorption. To ensure that the thermal front breaks through the contactor, the total mass of the adsorbent layer and barrier wall between the adsorption channel and heating/cooling channel should be less than about 10 times the mass of the adsorbent materials, preferably less than about 5 times the mass of the adsorbent materials, even more preferably less than about 2 times the mass of the adsorbent materials and most preferably less than about 1.5 times the mass of the adsorbent materials.

As the thermal wave moves through the contactor 941(b) being regenerated, water condenses out of the gas stream. Condensation occurs because the temperature of the gas falls as it passes along the contactor. The concentration of water vapor in gas stream 981 coming out of the heating/cooling channels 943(b) is nearly that for saturated gas at the temperature of stream 981 which can be more than about 100° C. lower than the stream 911 entering the regenerator. Because liquid water falls out of the stream 915 passing through the contactor 941(b) being regenerated, it can be advantageous to align the contactor so that the gas flows downward and the liquid flows under action of gravity concurrently with the gas to the bottom of the contactor. An optional method can be provided to remove condensed water from the contactor to form water stream 967. Optionally a knockout vessel 991 can be provided to remove any mist of liquid water flow coming out of the contactor. It is preferred that there is not a significant amount of liquid phase water flowing along with the cooled partially dehydrated flue gas stream 961.

In this example the gas passing through the heating/cooling channels of the contactor 943(b) moves in the same direction as gas passing through the adsorption channels 945(a) during the adsorption step (i.e. co-currently). Elements 920 and 925 as shown in FIG. 10 hereof, represent the inlet end and outlet end of the adsorption channels, respectively. In this example the microporous adsorbent is chosen such that water is a strongly adsorbed species, $CO_2$ is adsorbed somewhat less strongly, and $N_2$ and $O_2$ are weakly adsorbed. Examples of microporous materials that have this ordering of adsorption include zeolites such as zeolite 4A, 5A, 13X, NaX, and NaY. Trace materials such as $SO_x$ and $NO_x$ can be very strongly adsorbed. The following description of regenerator operation will apply to a contactor that was designed and operated to remove most of the $CO_2$ from the flue gas and the description will focus on the majority components in the flue gas. The process described will capture much of the $SO_x$ and $NO_x$ from the gas stream. It should be noted that it is possible to use the principles described in this example to remove $SO_x$ and $NO_x$ from gas streams in a process that captures less of the $CO_2$.

In the co-current thermal wave desorption process the least strongly adsorbed $N_2$ and $O_2$ species flow out of the contactor in the initial phase of the desorption process forming stream 997. It can be advantageous to divide the stream 997 coming out of the contactor into streams emerging at earlier versus later times, because streams emerging at different times will have different $CO_2$ and water concentrations and thus may preferably be processed differently. In an optional embodiment of the process valve 931 is opened at the start of the regeneration step allowing stream 997 to flow and form stream 971. Stream 971, recovered early in the regeneration, has very low $CO_2$ concentration. In the process shown in FIG. 10 hereof this stream is combined with stream 963 which is ultimately vented through a stack. As time progresses, the concentration of $CO_2$ in stream 971 begins to increase and valve 931 is closed to stop flow in stream 971. In this optional embodiment valve 933 is "simultaneously" opened to start flow in stream 973. The time at which these valves actuate sets the $CO_2$ purity in stream 973. Alternatively valve 933 was opened at the start of the regenerations process allowing stream 997 to flow and form stream 973. Stream 973 contains the majority of the $CO_2$ that was originally in the stack gas. The concentration of $CO_2$ in stream 973 is high enough that it can be sent to a sequestration process with little or no additional processing. In this example the stream is produced at atmospheric or slightly higher than atmospheric pressures. It is possible to design processes producing stream 973 from pressures ranging from vacuum to several (approximately 3) atmospheres. It is less desirable to produce stream 973 at sub-atmospheric pressures because this increases costs of compression in CO2 sequestration processes.

Stream 973 can be sent to different types of $CO_2$ sequestration processes. Non-limiting examples include sending the $CO_2$ into underground formations such as aquifers with a top seal that prevents significant loss of injected acid gas components, oil reservoirs, gas reservoirs, depleted oil reservoirs, depleted gas reservoirs, and unmineable coalbeds. Deep open storage is also a potential disposition for the $CO_2$, through purity requirements can be anticipated to be more stringent. Typically $CO_2$ has to be compressed to pressures greater than about 2,000 psi and often to pressures greater than about 5,000 psi to be injected into these types of underground formations. Several properties of stream 973 make it suitable for compression in a sequestration process. These properties include the fact that its temperature is significantly below that of the stack gas and it is highly concentrated in $CO_2$. In some instances additional processing is required before stream 973 is sequestered. A non-limiting example of an additional processing step would be a more rigorous dehydration of the stream to mitigate potential corrosion in pipes and compressors used in the sequestration process. Towards the end of the regeneration process the $H_2O$ concentration in stream 973 increases. To minimize potential corrosion problems in equipment used to sequester $CO_2$ it can be advantageous to separate the stream coming out towards the end of the regeneration process and to handle this stream separately. In an optional embodiment when the $H_2O$ concentration in stream 973 increases above a desired threshold, valve 933 is closed and valve 935 is opened. This stops flow of stream 973 and starts flow of stream 975 that has a higher concentration of water. Stream 975 can then be dehydrated separately and then recombined with stream 971.

The cool partially dehydrated flue gas stream 961 coming out of the contactor being regenerated, 941(b), is sent to contactor 941(a) that is undergoing an adsorption step. The stream 961 is sent through the adsorption channels 945(a) of the contactor where a microporous adsorbent preferentially removes $CO_2$ and $H_2O$. Contactor 941(a) can optionally be constructed with several different microporous adsorbents along the length of the channels 945(a). In one embodiment where different microporous adsorbents are placed along the length of the channels 945 (a), the adsorbent that is most selective for $H_2O$ is placed at the beginning of the channels. In this manner the water vapor partial pressure in the stream can be reduced allowing adsorbents towards the end of the channel to operate more effectively for $CO_2$ removal. Zeolites with large cation concentrations such as 4A, 5A, NaX are examples of microporous adsorbents that can operate more effectively when they are dry. The reason for this is that the $CO_2$ adsorption isotherm of zeolites with large cation concentrations tends to increase when the zeolite is dry (i.e. the $CO_2$ isotherm of a dry cationic zeolite usually lies above a wet zeolite). Materials that can be used to remove water include silica, alumina, carbons, and zeolites.

In this example, a single type of microporous adsorbent lines the adsorbent channels 945(a). At the start of the adsorption process the temperature of the contactor 941(a) is the same as that produced at the end of the cooling step in FIG. 10(c). This temperature is slightly above that of the ambient air in the atmosphere. As the adsorption step begins $CO_2$ and $H_2O$ are selectively taken up by the adsorbent near the front end 920 of the contactor. The concentration of $CO_2$ and $H_2O$ in the remaining portion of the adsorbent is low and nearly equal to that at the end of the regeneration step in FIG. 10(b) and the $CO_2$ concentration of gas stream 963 coming out of the contactor 941(a) is less than about 5% of that in the flue gas stream 911.

In this example the microporous adsorbent has the property that $H_2O$ is more strongly adsorbed than $CO_2$. An example of a microporous zeolite adsorbent with this property is zeolite 5A. For this zeolite as well as any other microporous adsorbent the temperature increases when molecules are adsorbed. The temperature rise is determined by the heat of adsorption of the sorbed species, the amount adsorbed; the thermal conductivity in the contactor, and the thermal mass of the contactor. An optional stream 919 can be flowed through the contactor to limit the temperature rise in the contactor. Stream 919 is derived from the ambient air and is blown through the heating/cooling channels 943(a) of the contactor. In the embodiment shown in FIG. 10(a) it moves counter-currently to stream 961 that flows through the adsorption channels. The stream 919 removes heat generated by the heat of adsorption and forms stream 921 exiting the contactor that carries away most of this heat. In a different embodiment this optional stream 919 can flow co-currently with stream 961.

As the adsorption step continues relatively sharp concentration fronts in the adsorbed phase concentration (i.e. adsorbates in the microporous material lining the channel) move along the length of the contactor. The concentration front for $H_2O$ is closer to the entrance of the adsorber channel than that for $CO_2$. The way in which they move with time down the length of the adsorber channel is referred to as concentration waves. With time these waves or fronts advance along the length of the adsorption channel. As these waves advance, the $CO_2$ concentration in the outlet stream 963 remains low until $CO_2$ front reaches the end 925 of the contactor. At this point in time the $CO_2$ concentration in the outlet stream 963 begins to rise and the adsorption step is stopped.

The cool stream 963 (with the $CO_2$ removed) is routed to a contactor 941(c) that has been regenerated and is undergoing a cooling step. Additional cool gas produced in the regeneration process (stream 971) can optionally be added to stream 963 to form stream 995. This stream 995 is introduced into the heating/cooling channels of the contactor 941(c). At the start of the cooling step contactor 941(c) is near the temperature of the flue gas stream 911. As stream 995 begins to flow through the contactor a cooing thermal wave develops. This cooling wave is such that the temperature of the contactor near the inlet side 920 is low and at a sharp front located further along the length of the contactor the temperature rises abruptly. The gas exiting the contactor 985 remains hot as the thermal wave advances across the contactor. If an optional thermal mass is used in the regeneration step then the gas stream 985 can also be passed through the thermal mass 983(c). When a thermal mass is used in the process the thermal wave breaks through the end of the contactor and cools the thermal mass before the cooling process is terminated. In this optional embodiment the gas stream exiting the thermal mass 965 remains hot during the majority of the cooling step. The hot gas stream 965 is substantially free of $CO_2$ and can be vented or sent up a stack. The cooling step is terminated simultaneously with the adsorption and regeneration steps. Throughout the cooling step there is no flow out of the adsorbent channels 945(c).

What is claimed is:

1. A process for the removing $CO_2$ from a flue gas stream containing $CO_2$, which process comprises:
    a) conducting said flue gas stream to a temperature swing adsorption gas separation unit wherein the gas separation unit contains at least one adsorbent contactor having a plurality of open flow channels through which the flue gas stream flows, wherein the surface of said flow channels are comprised of an adsorbent material that is capable of adsorbing $CO_2$ from said flue gas stream, thereby resulting in a substantially $CO_2$ free flue gas stream and $CO_2$ adsorbed onto said adsorbent material;
    b) venting said substantially $CO_2$ free flue gas stream into the atmosphere;
    c) heating said contactor having $CO_2$ adsorbed thereon to an effective temperature that results in the desorption of at least a fraction of $CO_2$ thereby resulting in a $CO_2$-rich stream;
    d) compressing said $CO_2$-rich stream to a pressure in excess of about 1000 psig thereby resulting in a compressed $CO_2$-rich stream whose temperature has been substantially raised during compressing;
    e) cooling said compressed $CO_2$-rich stream by use of a suitable heat-exchange fluid at a first temperature that captures heat from said $CO_2$-rich stream thereby resulting in a $CO_2$-rich stream of substantially reduced temperature and a heat-exchange fluid having a substantially higher second temperature;
    f) using at least a portion of the heat from the heat-exchange fluid of substantially higher second temperature to provide heat to the contactor during the desorption step c) above.

2. The process of claim 1 wherein a temperature swing adsorption cycle is performed at a cycle time of less than about 2 minutes between successive adsorption steps.

3. The process of claim 1 wherein at least about 75 mol % of the $CO_2$ in the flue gas stream is removed to produce the substantially $CO_2$ free flue gas stream.

4. The process of claim 1 wherein the adsorbent material is comprised of a zeolite.

5. The process of claim 4 wherein the zeolite is a cationic zeolite having Si/Al molar ratio of less than about 5.

6. The process of claim 1 wherein the compressing is done in multiple compression stages and cooling is done between compression stages and at the end of the last compression stage.

7. The process of the claim 6 wherein a compression stage, other than the last compression stage, ends when the $CO_2$-rich stream reaches a temperature of about 350° C.

8. The process of claim 1 wherein heat-exchange fluid is comprised of a fluid selected from the group consisting of water and a hydrocarbon oil.

9. The process of claim 1 wherein there are multiple adsorbent contactors, each comprised of:
    i) a gas inlet end; and
    ii) a gas outlet end;
    wherein the gas inlet end and the gas outlet end are in fluid connection by a plurality of open flow channels wherein the surface of the open flow channels are comprised of an adsorbent material has a selectivity for $CO_2$ over $N_2$ of greater than 1.

10. The process of claim 9 wherein the contactor has less than about 20% of its open pore volume in pores greater than about 20 angstroms.

11. The process of claim 1 wherein the contactor is comprised of at least two adsorbent materials and the first adsorbent material has a selectively for water over $CO_2$ of greater than 1 and is located upstream with respect to the flow of flue gas stream to a second adsorbent material that has a selectivity for $CO_2$ over $N_2$ of greater than 1.

12. The process of claim 11 wherein water is adsorbed from the flue gas stream in the first adsorbent material so that less than about 400 ppmv of water remains in the flue gas stream downstream of the first adsorbent material.

13. The process of claim 12 wherein water is adsorbed from the flue gas stream in the first adsorbent material so that less than about 50 ppmv of water remains in the flue gas stream downstream of the first adsorbent material.

14. The process of claim 1 wherein a first adsorbent material that has a selectivity for water over $CO_2$ of greater than 1 is part of an adsorbent contactor that is separate from an adsorbent contactor containing the second adsorbent material that has a selectivity $CO_2$ over $N_2$ of greater than 1.

15. The process of claim 1 wherein the substantially $CO_2$ rich stream contains greater than 85 mol % $CO_2$.

16. The process of claim 11 wherein NOx, SOx or both NOx and SOx are adsorbed.

17. The process of claim 11 wherein the second adsorbent material is a cationic zeolite having a Si/Al molar ratio of less than about 5.

18. The process of claim 1 wherein the adsorbent contactor is directly heated by passing the heat exchange fluid through the same flow channels as the flue gas stream, thereby desorbing $CO_2$ into the heat exchange fluid.

19. The process of claim 18 wherein the heat exchange fluid is passed co-current or counter-current through the flow channels compared to the direction of flow of the flue gas stream.

20. The process of claim 1 wherein a first fraction of the flow channels of the contactor are for receiving the flow of flue gas stream and a second fraction of flow channels are for receiving the flow of heat exchange fluid and wherein at least a portion of the channels of the two fractions are contiguous to each other, but not in fluid communication, so that heat flowing through said second fraction of flow channels is capable of effectively indirectly heating said first fraction of flow channels to provide heat for desorption.

21. The process of claim 20 wherein there are provided multiple contactors at least one of which is upstream to at least one other contactor wherein said at least one upstream contactor contains an adsorbent material that has a selectivity for at least one component selected for the group consisting of water, $SO_x$, and $NO_x$ over $CO_2$ greater than 1.

22. The process of claim 1 wherein the separation unit further comprises at least one upstream contactor has a selectivity for water over any other component in the flue gas stream of greater than 1.

23. The process of claim 1 wherein said contactor contains at least two adsorbent materials and the first adsorbent material has a selectivity for water over $CO_2$ of greater than 1 and the second adsorbent material has a selectivity for $CO_2$ over water of greater than 1, and wherein the first adsorbent material is located upstream, with respect to the flow of said flue gas stream, of the second adsorbent material.

24. The process of claim 1 wherein all flow channels of said contactor have substantially the same channel gap.

25. The process of claim 1 wherein the of the flue gas entering the temperature swing adsorption gas separation unit is at a temperature from about 100° C. to about 250° C.

26. The process of claim 18 wherein at least a fraction of the $CO_2$ is separated from the heat exchange fluid after desorption thereby resulting in a second $CO_2$ rich stream which is then compressed to a higher pressure.

27. The process of claim 1 wherein at least one contactor contains an adsorbent that is capable of removing at least 2 molecular species.

28. The process of claim 27 wherein the molecular species are water and $CO_2$.

* * * * *